United States Patent
Hagano et al.

(10) Patent No.: US 6,681,817 B2
(45) Date of Patent: Jan. 27, 2004

(54) FUELING DEVICE

(75) Inventors: Hiroyuki Hagano, Inazawa (JP); Masayuki Nakagawa, Iwakura (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/247,506

(22) Filed: Sep. 20, 2002

(65) Prior Publication Data

US 2003/0024599 A1 Feb. 6, 2003

Related U.S. Application Data

(62) Division of application No. 10/060,303, filed on Feb. 1, 2002, now Pat. No. 6,474,376, which is a division of application No. 09/666,155, filed on Sep. 19, 2000, now abandoned.

(30) Foreign Application Priority Data

| Sep. 22, 1999 | (JP) | ............................................ 11-268158 |
| Sep. 22, 1999 | (JP) | ............................................ 11-268164 |
| Sep. 27, 1999 | (JP) | ............................................ 11-272654 |
| Mar. 2, 2000 | (JP) | ............................................ 2000-57177 |

(51) Int. Cl.$^7$ .................................................. B65B 1/04
(52) U.S. Cl. ........................ 141/348; 141/349; 141/350; 141/312
(58) Field of Search ................................. 141/348, 349, 141/350, 312; 220/86.2, 86.3, DIG. 33

(56) References Cited

U.S. PATENT DOCUMENTS

| 1,614,780 A | 1/1927 | Ehlers | |
| 1,865,465 A | 7/1932 | Geyer | ........................ 220/86.2 |
| 2,017,837 A | 10/1935 | Anschicks | |
| 2,054,145 A | 9/1936 | Tandy | |
| 2,154,876 A | 4/1939 | Thompson | |
| 2,247,509 A | 7/1941 | Lebus | ........................ 220/86.2 |
| 2,534,003 A | 12/1950 | Culver et al. | ............... 220/86.2 |
| 3,911,977 A | * 10/1975 | Berger | ......................... 141/348 |
| 4,091,959 A | * 5/1978 | O'Banion | .................. 220/86.2 |
| 4,265,752 A | 5/1981 | O'Banion | .................. 220/86.2 |
| 4,467,937 A | * 8/1984 | Shaw | ......................... 220/86.2 |
| 5,467,621 A | * 11/1995 | Gravino | ............... 220/DIG. 33 |
| 5,580,258 A | 12/1996 | Wakata | |
| 5,732,840 A | 3/1998 | Foltz | .......................... 220/86.2 |
| 6,209,745 B1 | 4/2001 | Jansson | ............... 220/DIG. 33 |
| 6,231,106 B1 | 5/2001 | Nagasaka | ............. 220/DIG. 33 |
| 6,260,726 B1 | 7/2001 | Muth et al. | ........... 220/DIG. 33 |
| 6,279,626 B1 | * 8/2001 | Schmitt et al. | ............. 141/348 |
| 6,286,704 B1 | 9/2001 | Harris | ................. 220/DIG. 33 |
| 6,408,903 B1 | 6/2002 | Theuer et al. | ........ 220/DIG. 33 |

FOREIGN PATENT DOCUMENTS

| EP | 0464420 A1 | 1/1992 |
| EP | 0691233 A2 | 1/1996 |
| EP | 0 788 915 | 8/1997 |

* cited by examiner

Primary Examiner—Gene Mancene
Assistant Examiner—Khoa Huynh
(74) Attorney, Agent, or Firm—Posz & Bethards, PLC

(57) ABSTRACT

The fueling device includes a casing main body with an inlet opening. The casing main body is mountable in the fuel passage of the fuel filler pipe. A cap main body for opening and closing the inlet opening is engageable with the casing main body. A shutter is disposed in the fuel passage on the fuel tank side and is urged closed by a biasing member. A seal ring is mounted on the shutter, which is seated on a seat surface of the casing main body so as to seal the interior of the fuel tank in an air-tight manner against the outside by compression of the seal ring between the shutter and the seat surface. Engagement catches that fasten the cap main body to the casing main body operate to connect the cap main body and the shutter in such a manner that rotational force of the cap main body is converted into force in the direction in which the seal component is pressed to the seat surface to compress the sealing ring therebetween.

4 Claims, 33 Drawing Sheets

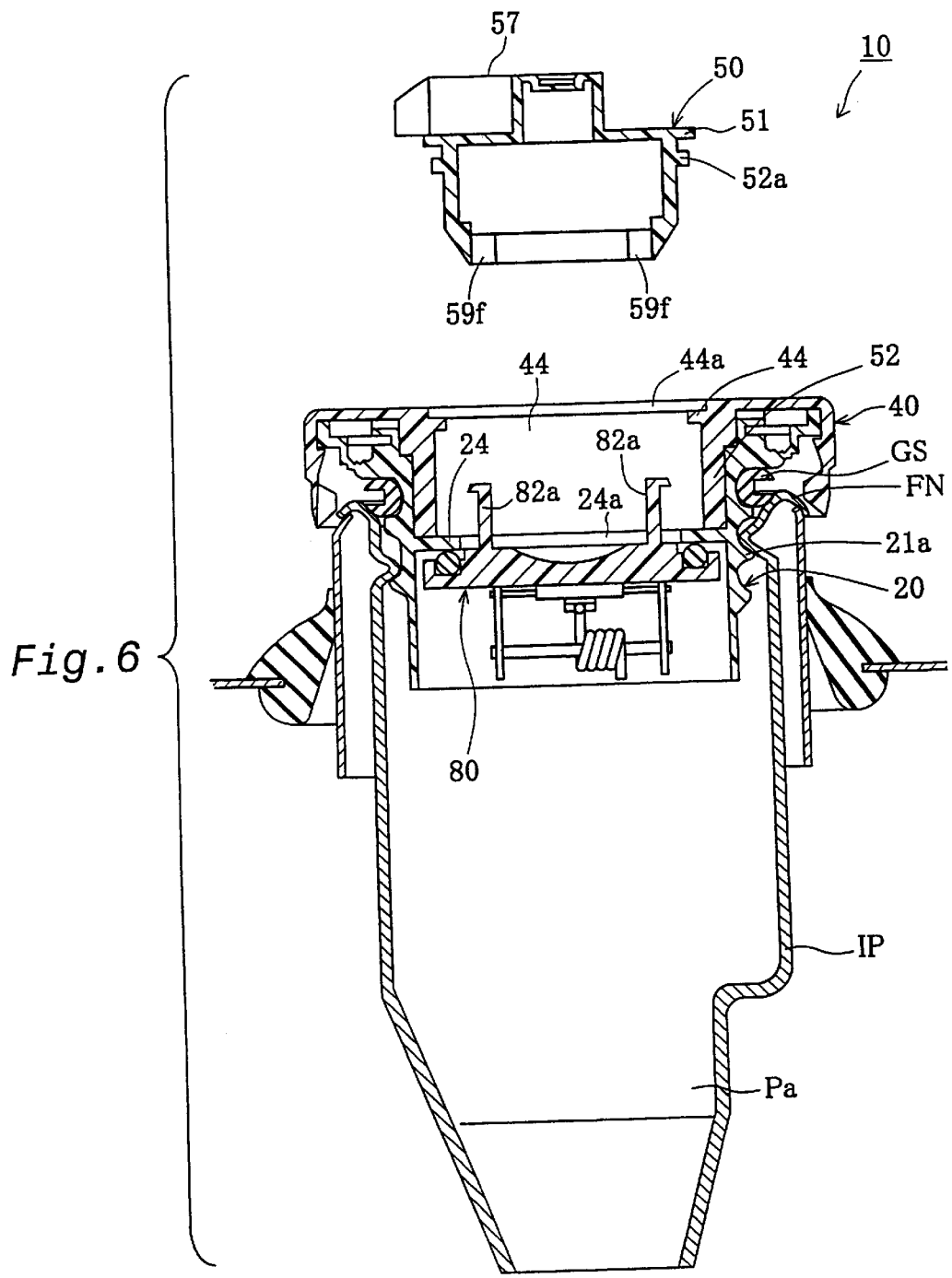

FUELING DEVICE

This Application is a Divisional of U.S. application Ser. No. 10/060,303 filed Feb. 1, 2002 now U.S. Pat. No. 6,474,376, which was allowed Jul. 1, 2002, which is a divisional of U.S. application Ser. No. 09/666,155, filed Sep. 19, 2000, now abandoned.

Priority is claimed based on Japanese Patent Application No. 11-268158 filed on Sep. 22, 1999, Japanese Patent Application No. 11-268164 filed on Sep. 22, 1999, Japanese Patent Application No. 11-272654 filed on Sep. 27, 1999, and Japanese Patent Application No. 2000-57177 filed on Mar. 2, 2000, the disclosures of each of which are incorporated herein by reference.

BACKGROUND OF THE INVENTION

1. Field of the Invention

The present invention relates to a fueling device for fueling a fuel tank through a passage of a fuel filler pipe.

2. Description of the Related Art

In conventional fueling devices for fueling a fuel tank through a filler pipe, the fuel cap is open when fuel is supplied through a fuel filler pipe. The fuel cap has a sealing member which, in a closed position, is inserted between the cap and an inlet opening of the fuel filler pipe to prevent fuel vapor in the fuel tank from escaping into the atmosphere. The sealing member is in the form of a gasket extending around the periphery of a cylindrical casing main body. When the fuel cap is screwed onto the opening of the filling neck, the gasket provides air-tight sealing force, while subject to torque caused by rotating friction force, against the filling neck.

Applicant has found that such torque is not readily applied uniformly across the gasket as a whole, and complicates efforts to improve the sealing properties. Additionally, the gasket is removed with the fuel cap when the fuel cap is placed in the open position, resulting in stains and damage to the seal surface of the gasket. In such cases, not only are the sealing properties of the gasket compromised, but there is greater friction resistance with the gasket, tending to result in greater operating force required to open and close the fuel cap.

Furthermore, when a fueling gun is introduced into the inlet opening, the fueling gun strikes the inlet opening, damaging the seal in the opening in contact with the gasket. The sealing properties are compromised in this case as well due to possible damage to the gasket.

SUMMARY OF THE INVENTION

An object of the present invention is to provide a fueling device with better fuel cap operation when removed and returned to an inlet opening, as well as better fuel tank sealing properties for preventing escape of the fuel to the atmosphere.

In accordance with one embodiment of the present invention, a fueling device for fueling a fuel tank through the fuel passage of a fuel filler pipe comprises a casing main body that is disposed in the fuel passage of the fuel filler pipe. The casing main body has an inlet opening for introducing fuel. A cap main body having a handle allows the fuel passage to be opened and closed, and is capable of opening and closing the inlet opening by the operation of the handle. A shutter is coupled to the casing main body and is disposed in the fuel filler pipe for opening and closing the fuel passage. A connector couples the cap main body to the shutter in such a manner that an operating force exerted by the handle to close the fuel passage applies a closing force to the shutter to close the shutter.

The cap main body attached to the inlet opening of the casing main body is detachable from the fuel filler pipe to allow fuel to be supplied through the fuel passage of the fuel filler pipe into the fuel tank. When the cap main body engages the casing main body and is operated in the closing direction in order to close the inlet opening, its force is transmitted via the connector to the shutter. The connector converts force in the direction in which the handle closes the fuel passage into a closing force in the direction in which the shutter closes the fuel passage. This allows the shutter to close the fuel passage and maintain the fuel passage closed with higher sealing properties.

Preferably, the casing main body is detachable from the fuel filler pipe, and can comprise a seal component operable to press against the inner wall of the fuel filler pipe to seal the space therebetween. The casing main body can also comprise a cover detachably supporting the cap main body.

Also, the casing main body can be fixed to the fuel filler pipe while simultaneously sealing the inside of the fuel filler pipe against the outside, so as to improve the sealing and assembly properties.

The casing main body can also comprise a seat with a seat surface in a location facing away from the inlet opening, and a seal component detachable from the seat surface, wherein the handle is operated in the closing direction to allow the shutter to press the seal component against the seat surface. Consequently, the force in the direction in which the shutter closes the passage is transmitted to the seal component, providing even better sealing properties. The seal component may be mounted on the casing main body, the shutter, or the like. If the seat surface faces away from the inlet opening so as to be hidden from the opening in the fuel passage, the fuel gun will not strike the seat surface when the fuel gun is inserted into the fuel passage. The sealing properties are thus not compromised by damage to the seat surface.

The shutter preferably comprises a biasing member urging the seal component against the seat surface so as to enhance the sealing force in conjunction with the force applied when handle closes the passage. The biasing member urges the shutter towards the seat surface to main the fuel passage closed by the shutter until the shutter is pressed open by the fuel gun, which applies a force sufficient to overcome the biasing force.

The seat surface is also disposed on the inside of the fuel filler pipe in the present invention, and the seat surface is sealed by the seal component pressed by the shutter. Accordingly, rather than sealing the spirally expanding opening of the fuel filler pipe as in conventional techniques, the seal component can be made smaller, and better sealing properties can be obtained with lower force.

The seat surface and seal component are disposed on the inside of the fuel filler pipe, allowing the fuel filler pipe to protect the seal surface and the like against external forces and loads. Accordingly, more consistent sealing protection is attained.

Examples of structures for the seal component include O-rings, seal rings with a flat cross section, and the like. The seat surface can be flat, and can also be in the form of an annular protrusion in linear contact with the seal component, etc. The seal component, such as a seal ring, can be housed in an annular recess sized dispose the seal ring at a location lower then the upper surface of the shutter. In this case, the seat surface can be disposed so as to protrude into the annular recess.

The connector can comprise cam unit for converting the rotational force applied by the handle into force in the direction in which the shutter closes the passage.

The cam unit can furthermore convert the rotating force of the cap main body into force for compressing the seal component between the seat surface and the shutter to provide higher sealing force. The cam unit allows a greater degree of freedom in the selection of the material, surface treatment (state), and shape of the seal component, and also allows higher sealing properties to be designed, without subjecting the seal component to frictional forces and torque as in conventional technology.

In a preferred embodiment of the cam unit, the handle is provided with an engagement protrusion insertable into an insertion hole of the shutter. Rotational operation of the handle causes the engagement protrusion to engage the shutter and maintain the passage closed. Since the engagement protrusion does not protrude from the shutter, the fuel gun can be inserted without hindrance from the engagement protrusion or the like.

A guide surface in the form of a continuous curve directed toward the seal opening can also be provided in the passage on the opening side of the seat to face where the fuel gun is inserted. When the fuel gun is inserted into the passage on the opening side during fueling, the tip of the fuel gun is guided into the seal opening by the guide surface. The fuel gun can thus be smoothly inserted into the passage on the opening side without any deformation or the like caused by collision with the side of the opening of the seal opening. The sealing properties are thus preserved, without deformation of the seal surface during fueling.

According to another embodiment of the present invention, a fueling device for fueling a fuel tank comprises a fuel filler pipe that has a fuel passage for supplying fuel to a fuel tank, and that is formed of a first resin material. A casing main body that is disposed in the fuel filler pipe for introducing fuel has an inlet passage connected to the fuel passage, and a seat surface facing the inlet passage. The casing main body is formed of a second resin material different from the first resin material. A cap main body opens and closes the inlet passage, and has a seal component seated on the seat surface so as to seal the passage against the outside. An engagement component is interposed between the fuel filler pipe and casing main body to seal the space therebetween in an air-tight manner. The engagement component is formed of a third resin material. A portion of the sealing component is unitarily formed with either the casing main body or fuel filler pipe by insert molding, and the rest of the seal component is unitarily formed with the other of the casing main body or fuel filler pipe by welding. For example, when a portion of the seal component is insert molded to the casing main body, the fuel filler pipe is welded. On the other hand, when a portion of the seal component is insert molded to the fuel filler pipe, the casing main body is welded.

In this embodiment, the cap main body for opening and closing the inlet passage of the casing main body is removed to allow fuel to be supplied through the fuel passage of the fuel filler pipe to the fuel tank. When the inlet passage is closed by the cap main body, the seal component is seated on the seat surface to seal the passage against the outside.

Both the fuel filler pipe and casing main body are formed of resin material. The fuel filler pipe is formed of a first resin material, and the casing main body is formed of a second resin material that is different from, and does not melt with, the first resin material. But the fuel filler pipe and the casing main body are unitarily connected in an air-tight manner by the seal component. That is, a portion of the seal component is united with either the casing main body or fuel filler pipe by insert molding, while the other part of the seal component is united with the other of the casing main body or fuel filler pipe by welding. That is, the seal component unites the casing main body and fuel filler pipe, which do not melt together, by means of insert molding and welding.

Since a portion of the seal component can be welded to allow the casing main body or fuel filler pipe to be united in an air-tight manner, different resin materials and forming methods can be selected to form these components as befits their separate functions. For example, a material capable of affording greater surface precision on the seat surface can be used as the second resin material for forming the casing main body, while the first resin for forming the fuel filler pipe can be selected in consideration of formability, mechanical strength, cost, and the like. Different forming methods can be selected, such as injection molding for the casing main body and blow molding for the fuel filler pipe. Examples of welding include heat welding as well as other welding methods such as ultrasonic welding.

In a preferred modification to this embodiment, ribs with enlarged surface area are used to join the seal component and casing main body or fuel filler pipe at the connecting surface so as to enhance the bonding strength of the two by insert molding.

The other of the present inventions is a fueling device for fueling a fuel tank through the fuel passage of a fuel filler pipe, comprising: a handle operable to open and close the fuel passage; a shutter, disposed in the fuel filler pipe, for opening and closing the fuel passage; and a connector that connects the handle and shutter in such a way that an operating force exerted by the handle to close the fuel passage is converted into force to close the shutter.

BRIEF DESCRIPTION OF THE DRAWINGS

The invention will now be explained in further detail with reference to the following figures, in which:

FIG. 6 is a cross section of the cap main body when removed;

DESCRIPTION OF THE PREFERRED
EMBODIMENTS

Figure 1:
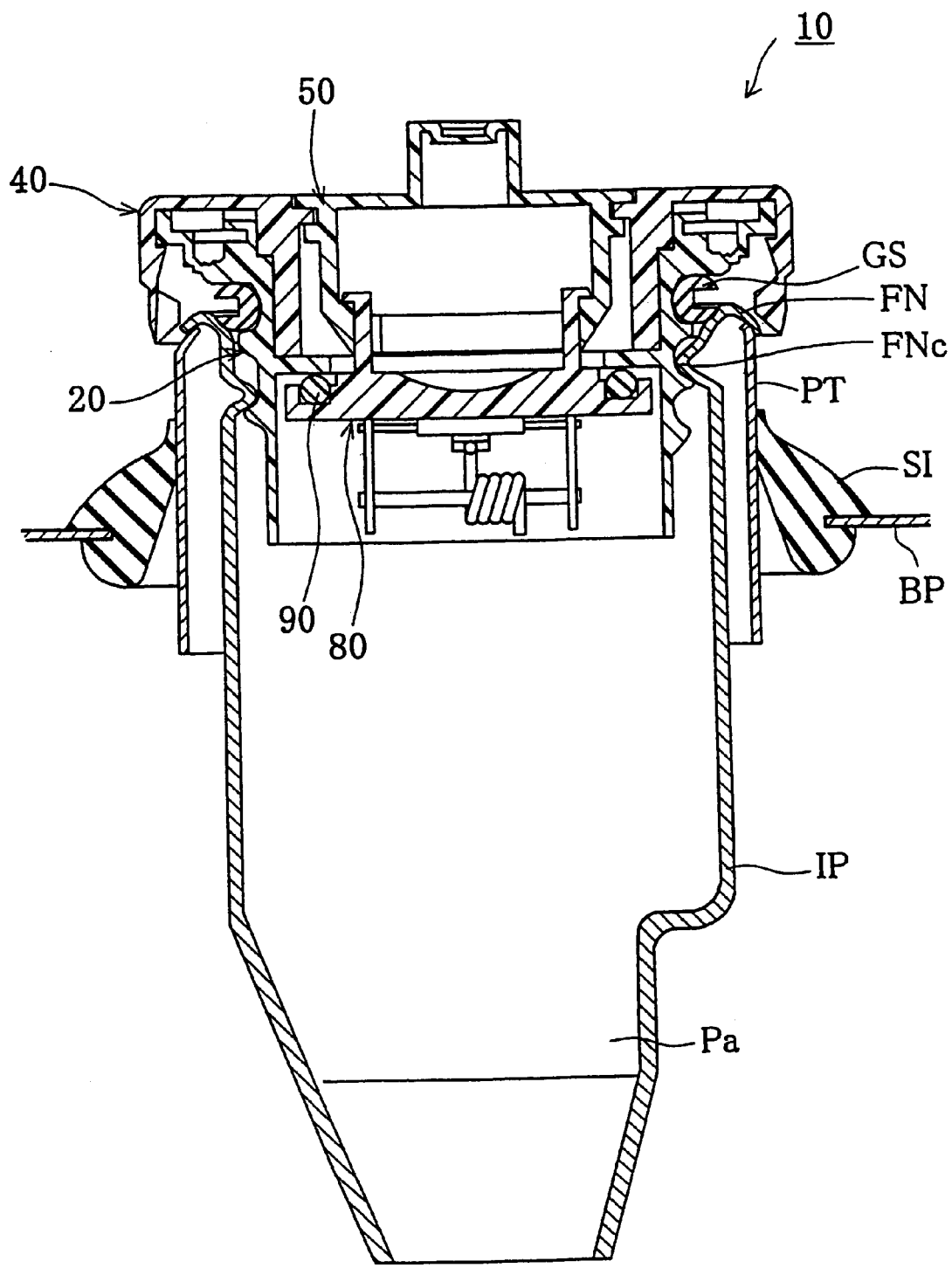
FIG. 1 is a cross section depicting a fueling device in accordance with a first embodiment of the present invention.
Figure 2:
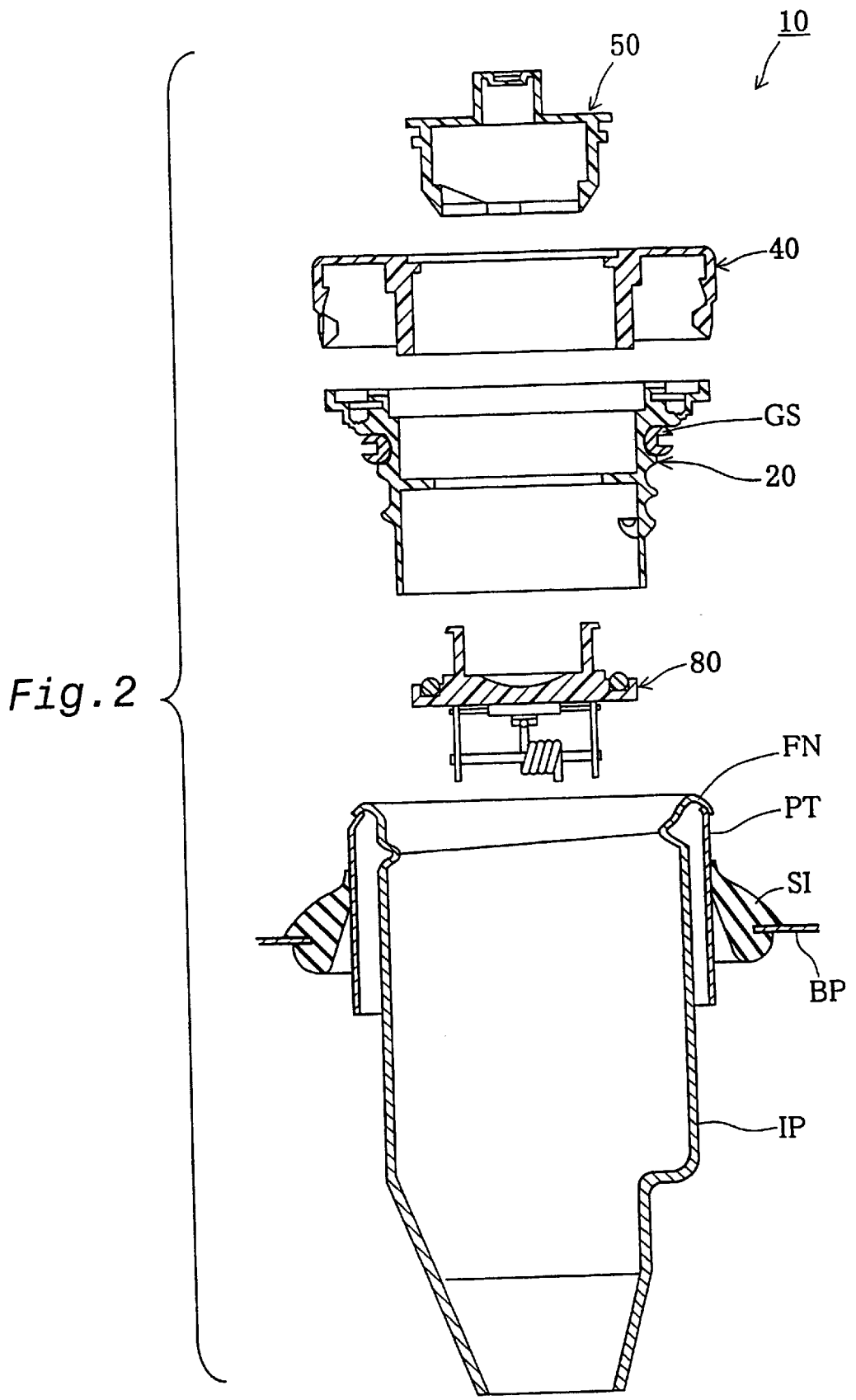
FIG. 2 is a cross section depicting an exploded view of the structural parts of the fueling device.

FIG. 1 is a cross section depicting a vehicle (e.g., automobile) fueling device 10 in accordance with a first embodiment of the first invention, and FIG. 2 is a cross section depicting in exploded view the structural parts of the fueling device 10. In FIGS. 1 and 2, the fueling device 10 is screwed onto the filler neck FN of an inlet pipe IP (fuel filler pipe) supplying fuel to the fuel tank (not shown in figure). The fueling device 10 comprises: a casing main body 20 formed of a synthetic resin material such as a polyacetal; a cover 40 formed of a synthetic resin material such as nylon, that is attached to the top of the casing main body 20; a cap main body 50 for closing the upper opening of the casing main body 20; a shutter 80 mounted in the casing main body 20; a seal ring 90 mounted on the shutter 80; and a gasket GS that is mounted around the upper outer periphery of the casing main body 20 to seal the space between the cap and the filler neck FN. A cylindrical protector PT for protecting the filler neck FN is mounted around the outer periphery of the filler neck FN. The protector PT is attached by way of an external seal component SI to a body plate BP so that the filler neck FN is supported by the body plate BP.

The fueling device 10 is fueled by a fuel gun (not shown in the figure) after the cap main body 50 has been removed. The structure of the fueling device 10 is described in detail below.

Figure 3:
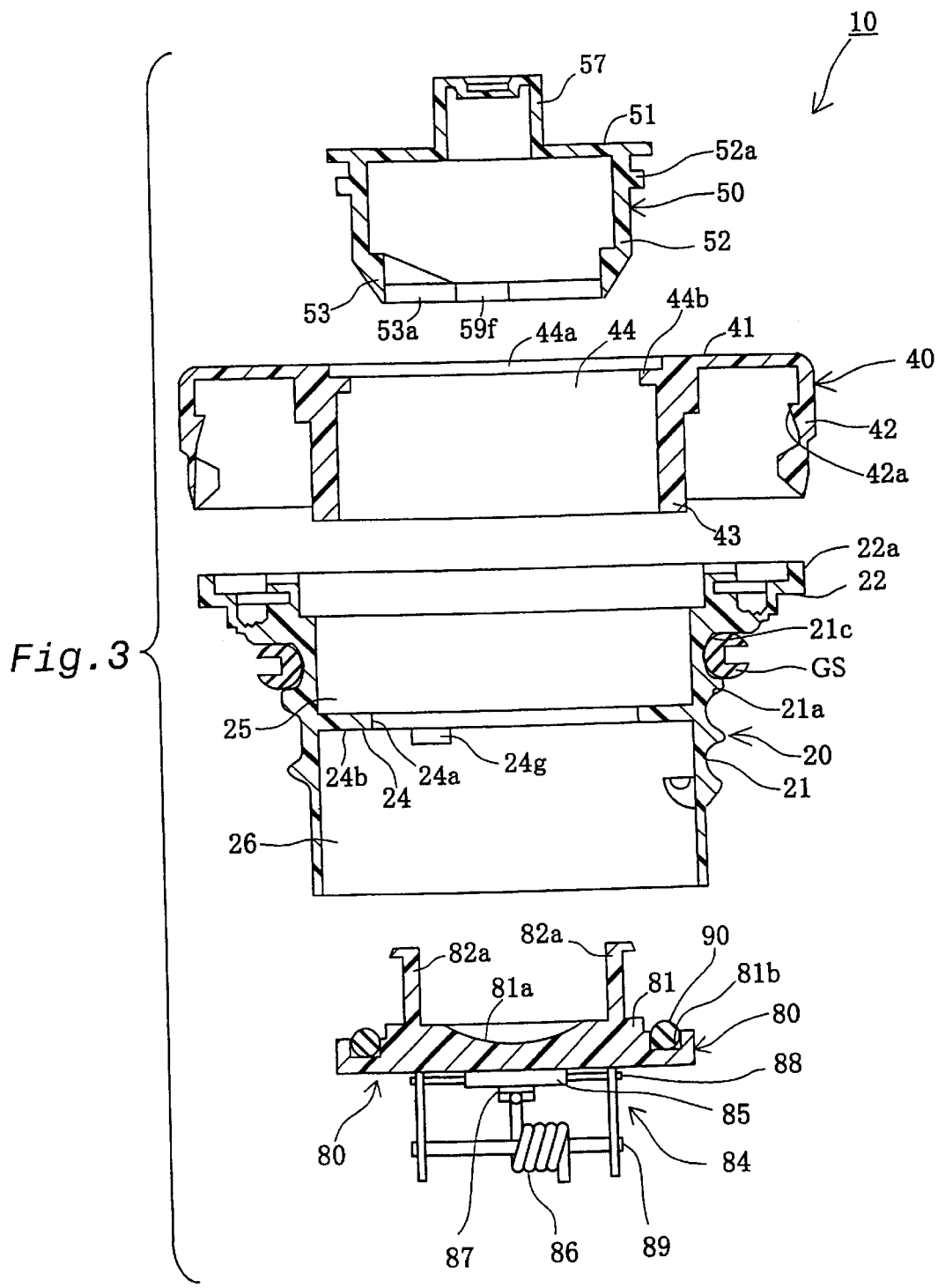
FIG. 3 is an enlarged cross section of the fueling device illustrated in FIG. 2.
Figure 4:
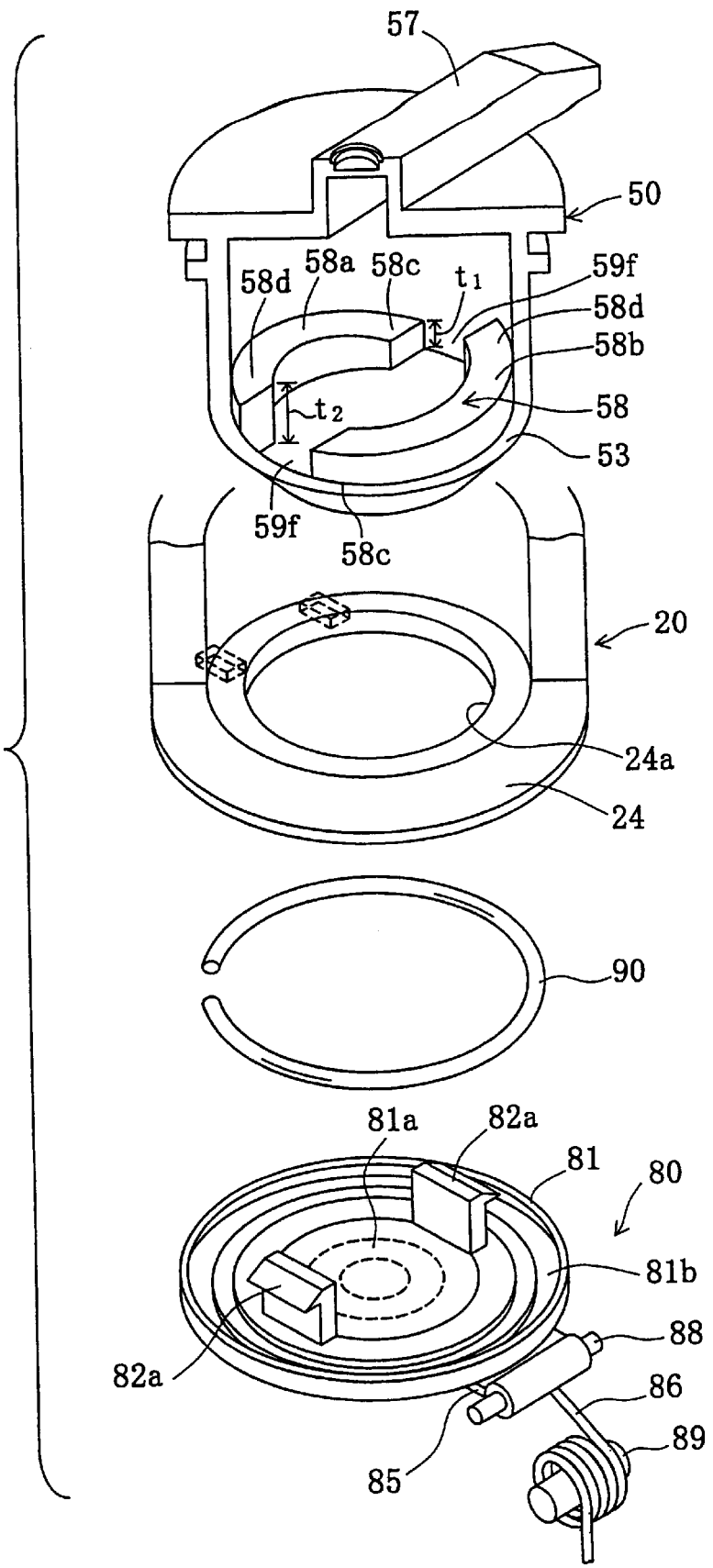
FIG. 4 is an oblique exploded view of the fueling device of the first embodiment.

FIG. 3 is an enlarged cross section of the fueling device 10 illustrated in FIG. 2, and FIG. 4 is an oblique exploded view of the fueling device 10. In FIGS. 3 and 4, the casing main body 20 is detachably mounted on the filler neck FN, and comprises a cylindrical side wall 21 and a flange 22 formed on the side wall 21, which are unitarily formed by injection molding using a resin material such as polyacetal. Midway in the casing main body 20, a partition wall 24 protrudes from the side wall 21 toward the center. The partition wall 24 divides the body into a mutually communicating upper chamber 25 and lower chamber 26. The upper chamber 25 is formed so as to house the cap main body 50, and the lower chamber 26 is formed so as to house the shutter 80. A thread 21a is formed on the outer periphery of the side wall 21. The thread 21a is formed in such a way as to be screwed to one thread FNc of the filler neck FN (see FIG. 1). The flange 22 comprises an upper engagement projection 22a for attachment to the cover 40, as described below, and a seal retention surface 21c for retaining the gasket GS relative to the side wall 21.

Figure 5A:
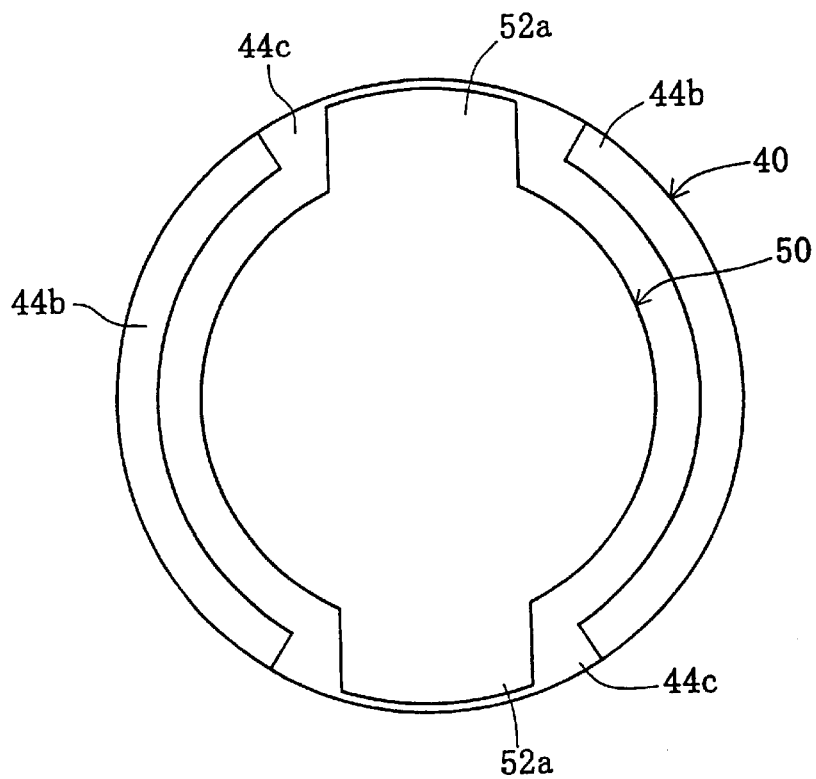
FIGS. 5A and 5B are illustrations of the positional relationship between the cover and cap main body of the fueling device of the first embodiment.
Figure 5B:
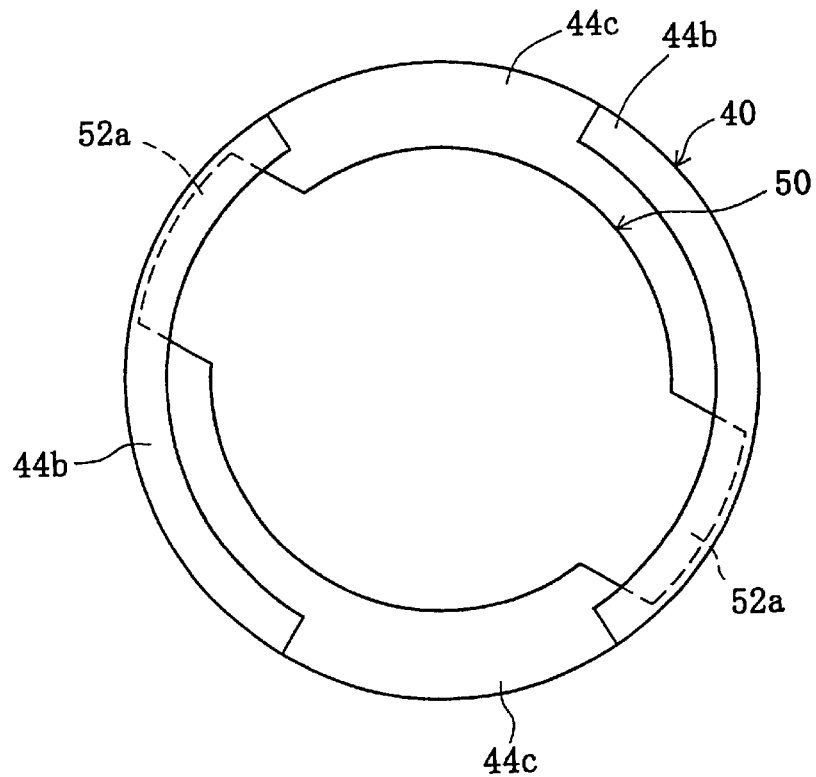

The cover 40 is mounted on the casing main body 20 to rotatably support the cap main body 50. The cover 40 comprises an upper plate 41 and a side plate 42. In the inner periphery of the upper plate 41, a support wall 43 having a cylindrical shape faces downward in the figure. An upper cover chamber 44 rotatably supports the cap main body 50, the top of which serves as an inlet opening 44a. Guide protrusions 44b are formed at the top of the support wall 43. FIGS. 5A and 5B illustrate the positional relationship between the cover 40 and cap main body 50, as viewed from above. FIG. 5A illustrates the cap main body 50 immediately after being inserted, and FIG. 5B illustrates the cap main body 50 rotated a predetermined angle. As shown in FIGS. 5A and 5B, the guide protrusions 44b comprise partially notched inserts 44c and 44c. As described below, the inserts 44c and 44c are formed so as to allow the insertion of the guide protrusions 52a of the cap main body 50. Engagement projections 42a that engage the upper engagement projection 22a of the flange 22 of the casing main body 20 to become attached to the casing main body 20 are formed on the inside of the side plate 42 of the cover 40 in FIG. 3.

The cap main body 50 is rotated a predetermined angle, by manual operation, for mounting on the cover 40, and is formed so as to open and close the inlet opening 44a of the cover 40. The cap main body 50 comprises a top plate 51, side wall 52 protruding from the lower surface of the top plate 51, and floor wall 53 that is formed at the bottom of the side wall 52 and having an insertion hole 53a. The cap main body 50 is formed in a cylindrical shape so as to be rotatably supported by the support wall 43 of the cover 40. The guide protrusions 52a are formed at the top of the side wall 52. As noted above in reference to FIGS. 5A and 5B, the guide protrusions 52a are insertable into the inserts 44c of the guide protrusions 44b of the cover 40, and come into contact with the inner surface of the guide protrusions 44b of the cover 40. This allows the cap main body 50 to be rotatably supported relative to the cover 40. A handle 57 is formed on the top plate 51 of the cap main body 50. The handle 57 is rotated a predetermined angle on the cap main body 50, allowing the cap main body 50 to be detachably operated relative to the cover 40.

As shown in FIG. 4, a cam 58 is formed on the upper surface of the floor wall 53 of the cap main body 50. The cam 58 comprises a pair of cam surfaces 58a and 58b centered around the cap main body 50. The cam surfaces 58a and 58b slope from a lower surface portion 58c to a higher surface portion 58d. The relationship of the thickness is t1<t2, where t1 is the thickness of the lower surface portion 58c, and t2 is the thickness of the higher surface portion 58d. Notches 59f and 59f are also formed between the cam surfaces 58a and 58b.

Figure 9:
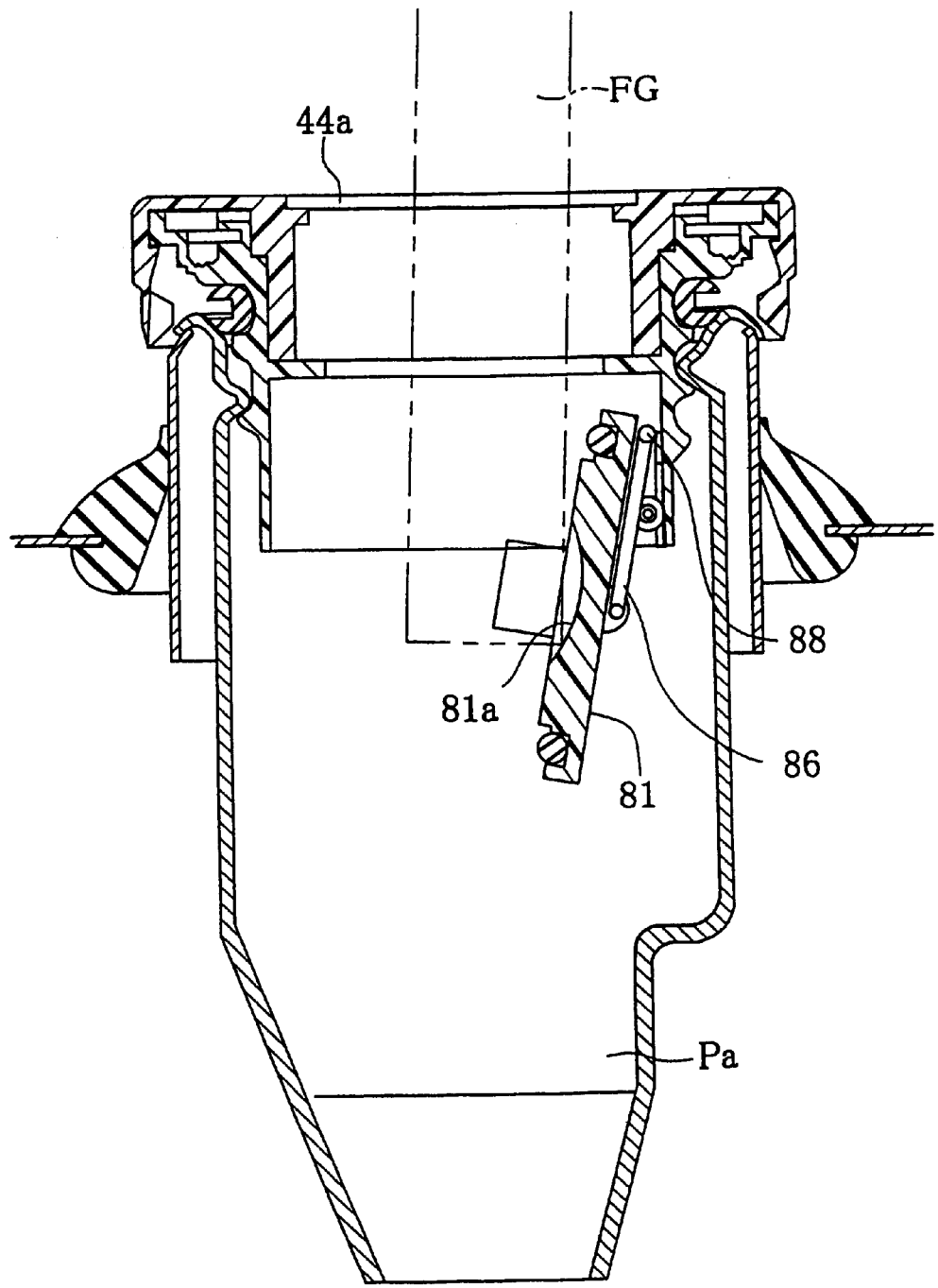
FIG. 9 is an illustration of a fuel gun inserted into the fueling device of the first embodiment.

In FIG. 3, the shutter 80 is attached to and detached from the partition wall 24 of the casing main body 20 to open and close the through hole 24a connected to the fuel passage Pa. FIG. 9 depicts the shutter 80 of FIG. 3 as viewed from a different angle by 90° relative to FIG. 3. The shutter 80 comprises a cylindrical shutter main body 81. An annular recess 81b is formed on the outer peripheral upper surface of the shutter 81, and the seal ring 90 is retained in the annular recess 81b. The seal ring 90 is formed so as to seal the seat surface 24b of the casing main body 20.

Engagement catches 82a and 82a forming a part of the connector protrude upward from the top of the shutter main body 81. The engagement catches 82a and 82a engage the cam surfaces 58a and 58b of the cap main body 50 as the cap main body 50 is rotated, thereby enhancing the sealability of the seal ring 90. The bottom of the shutter main body 81 is provided with energizing means 84. The energizing means 84 comprises a support plate 85 disposed under the shutter main body 81, and a helical spring 86 urging spring force against the support plate 85. The support plate 85 is rotatably supported by the casing main body 20 via a support shaft 88 at one end, and is supported at the other end via a center shaft 87 positioned at the center of the shutter main body 81. In this manner, the shutter main body 81 is rotatably supported relative to the casing main body 20. The shutter main body 81 is urged by the spring 86 in the closed direction. The spring 86 is supported at one end by a fixing shaft 89, and is in contact at the other end with the bottom surface of the support plate 85, urging the shutter main body 81 in the closed direction.

A recess 81a is formed in the upper surface of the shutter main body 81, serving as a curved surface to buffer collisions with the fuel gun. The underside of the partition wall 24 is provided with a positioning protrusion 24g that comes into contact with both sides of the support plate 85 for positioning purposes in order to enhance the sealing properties uniformly during the opening and closing operations of the shutter 80.

The opening and closing operations of the fueling device 10 are described below. FIG. 6 is a cross section of the cap main body 50 while removed. The fueling device 10 is mounted on the filler neck when the casing main body 20, cover 40, and shutter 80 in a unitary state are screwed, while in a unitary state, to the thread 21a of the filler neck FN. The fueling device 10 may be fitted to the filler neck FN after the cap main body 50 is preassembled with the casing main body 20. To facilitate this detailed description of the invention, the filler neck FN will be described as being fitted to the fueling device 10 from a state in which the cap main body 50 has been removed.

In the state depicted in FIG. 6, once the casing main body 20, cover 40, and shutter 80 are assembled with the filler neck FN, they are not removed from the filler neck FN; only the cap main body 50 is attached and detached. At such times, the space between the casing main body 20 and filler neck FN is sealed by the gasket GS. However, since the casing main body 20 is not removed from the filler neck FN, the high sealing properties can be maintained, with no rotation-related load exerted on the gasket GS.

With the cap main body 50 off as shown in FIG. 6, the handle 57 is held by the hand to insert the cap main body 50 through the inlet opening 44a of the cover 40. At this time, as shown in FIG. 5A, the guide protrusions 52a of the cap main body 50 are inserted while aligned with the inserts 44c of the cover 40.

In these operations, the engagement catches 82a and 82a of the shutter 80 pass from the through hole 24a of the partition wall 24 through the notches 59f and 59f of the cap main body 50. The top plate 51 of the cap main body 50 comes into contact with the guide protrusions 44b of the cover 40, preventing further movement of the cap main body 50 into the casing main body. At this time, the side wall 52 of the cap main body 50 is fitted to the top cover chamber 44 of the cover 40, so that the cap main body 50 is rotatable.

Figure 7:
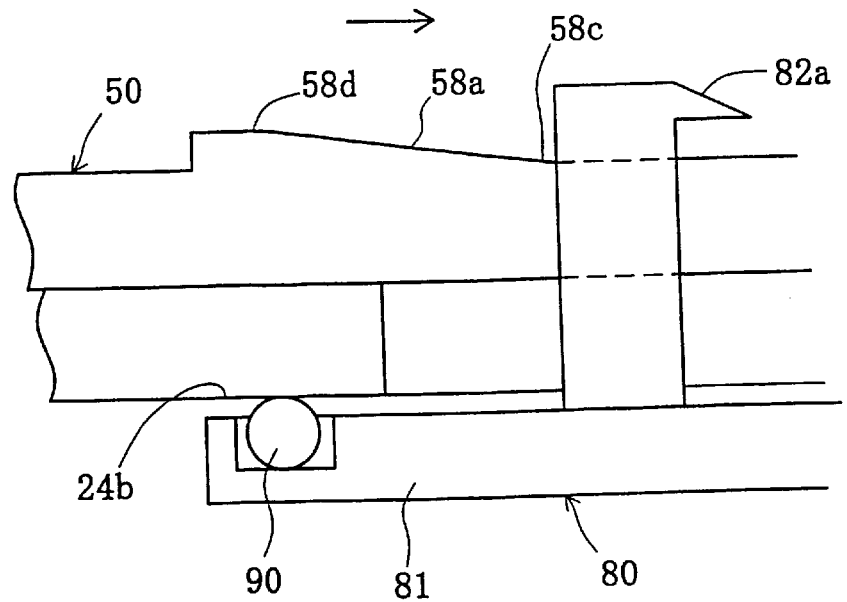
FIG. 7 is an enlarged sectional view of a portion of the fueling device, depicting the cap main body in an unsealed state.
Figure 8:
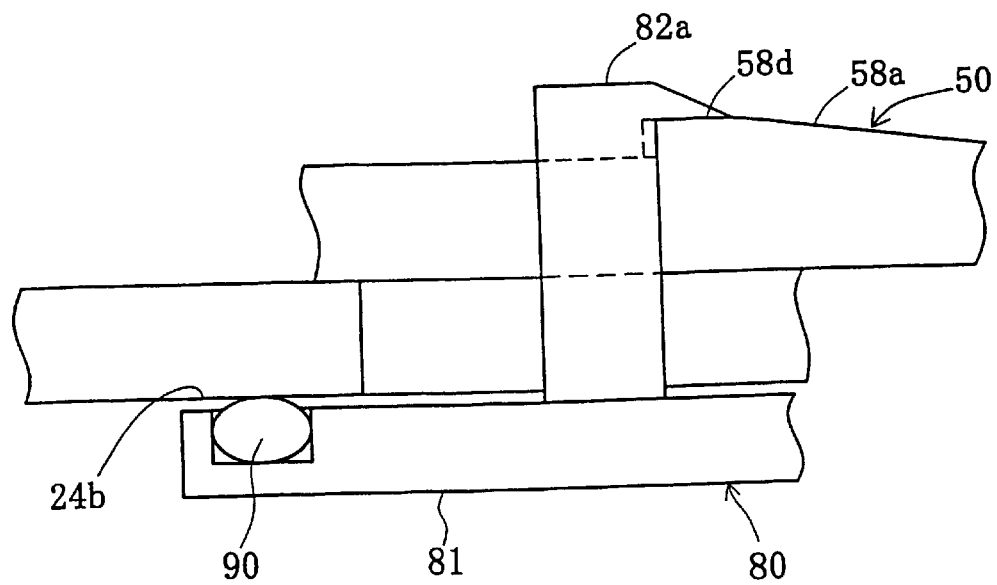
FIG. 8 is an enlarged sectional view similar to FIG. 7, but depicting the cap main body in a sealed state.

FIGS. 7 and 8 illustrate the engagement of the cap main body 50 and shutter 80. FIG. 7 illustrates the state before engagement, and FIG. 8 illustrates the state after engagement. When the cap main body 50 is rotated clockwise (direction of the arrow) from the state depicted in FIG. 7, the engagement catches 82a and 82a move reciprocally from the lower surface 58c of the cam surfaces 58a and 58b to the higher surface 58d in tandem with the rotation of the cap main body 50. As shown in FIG. 8, the engagement catches 82a and 82a engage with the higher surface 58d and lift the shutter main body 81. The lifting of the shutter main body 81 presses the seal ring 90 mounted on the shutter main body 81 against the seat surface 24b, sealing the space between the seal ring 90 and seat surface 24b.

If the cap main body 50 is removed from the filler neck FN, the handle 57 is manually rotated in the counterclockwise direction. This results in a transition from the state depicted in FIG. 8 to the state depicted in FIG. 7. In other words, when the cap main body 50 is rotated counterclockwise, the engagement catches 82a and 82a reciprocally shift from the higher surface 58d of the cam surfaces 58a and 58b to the lower surface 58c, and stop at the location of the notches 59f and 59f. When the cap main body 50 is lifted axially upward, the cap main body 50 is removed from the casing main body 20. This enables external passage from the upper cover chamber 44 through the insertion hole 53a. In this state, the shutter 80 is urged by the spring 86 into the closed position, with the seal ring 90 presses against the seat surface 24b.

Then, as shown in FIG. 9, when the fuel gun FG is inserted through the inlet opening 44a, the fuel gun presses the recess 81a of the shutter main body 81 and pivots the shutter main body 81 about the support shaft 88, against the urging force of the spring 86, so as to open the passage. This allows the fuel from the fuel gun to be supplied through the fuel passage Pa into the fuel tank. When the fuel gun FG is withdrawn, the shutter main body 81 closes the passage due to the urging force of the spring 86.

When the cap main body 50 closes the opening upon the conclusion of fueling as noted above, the fuel passage Pa is closed off with the high sealing properties afforded by the seal ring 90 firmly pressed against the seat surface 24b, resulting in the state depicted in FIG. 1.

The aforementioned fueling device 10 affords the following merits.

1) When the cap main body 50 is rotated after fueling to close off the dispensing opening, the rotating force of the cap main body 50 is converted into force in the direction in which the seal ring 90 of the shutter 80 is firmly pressed against the seat surface 24b, so that the seal ring 90 seals the seat surface 24b, thus providing high sealing properties between the interior of the fuel tank and the outside.

2) Since the seat surface 24b is formed on the reverse side of the partition wall 24 where the seat surface 24b will not be struck by the fuel gun FG, the seat surface 24b will not be damaged by the fuel gun, thereby allowing the high sealing properties to be preserved.

3) Since the seal ring 90 is disposed on the inside of the casing main body 20, the diameter can be smaller than that of gaskets disposed on the outside such as in conventional constructions. It is thus possible to further reduce the amount of fuel evaporating from the surface of the seal ring 90 due to fuel expansion.

4) The seal ring 90 is subject only to uniform compression force in the vertical direction between the shutter 80 and seat surface 24b, but is not subject to any torque as in the prior art, allowing uniform sealing force to be obtained, with better durability.

5) When the cap main body 50 is opened and closed, it is subject only to pressing force, but no substantial slip resistance from the seal ring 90, so that less torque is needed to manipulate the cap main body 50, with better manipulating properties.

Figure 10:
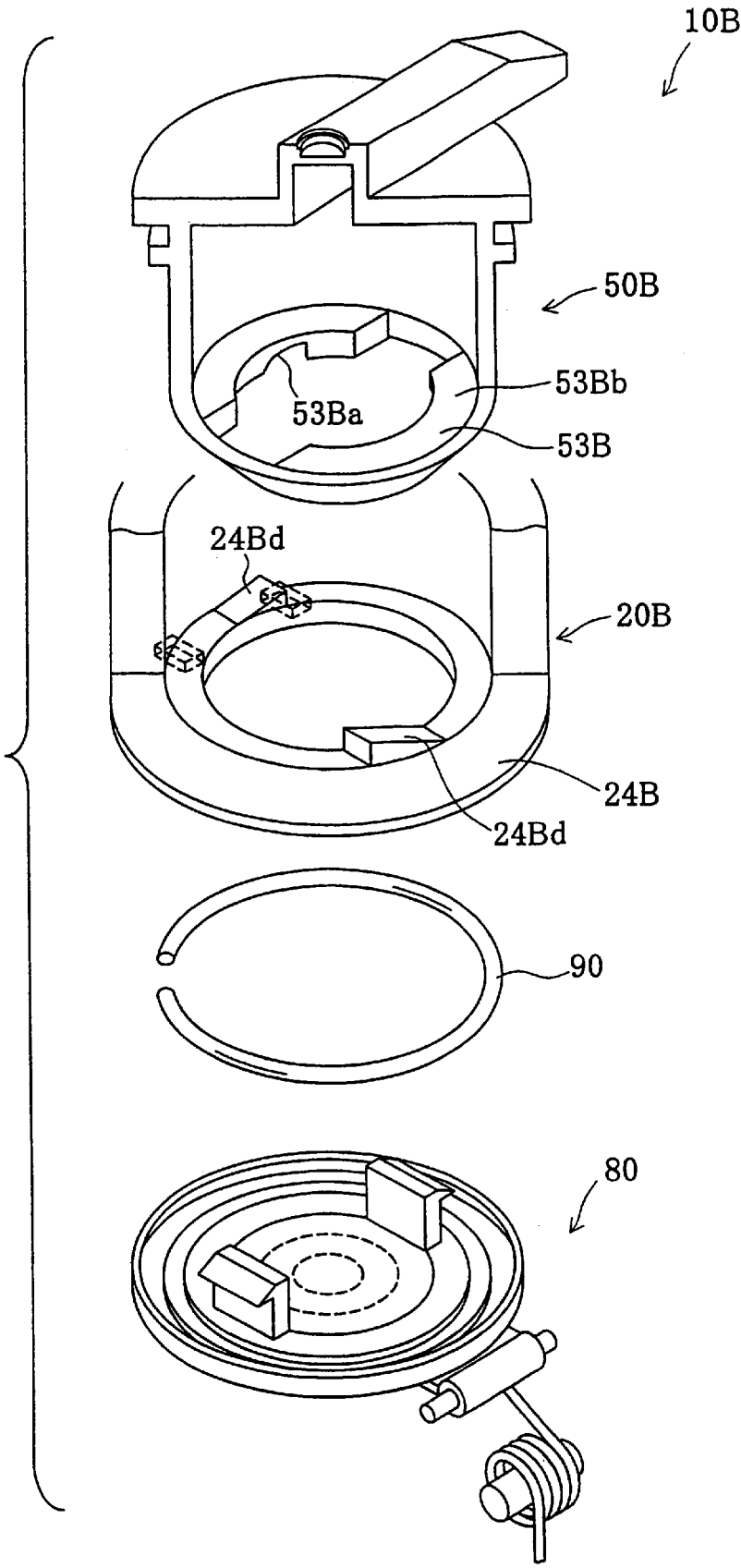
FIG. 10 is an oblique exploded view of the fueling device in accordance with a second embodiment.

FIG. 10 is an oblique view depicting an exploded view of the fueling device 10B in accordance with a second embodiment. In FIG. 10, the structure of the connector for lifting the shutter 80 by means of the rotation of the cap main body 50B in the fueling device 10B is different than that in the fueling device 10 of the first embodiment. That is, cam surfaces 24Bd and 24Bd are formed on the upper surface of the partition wall 24B of the casing main body 20B. The cam surfaces 24Bd and 24Bd are formed on a gradually higher slope in the clockwise direction. Inclined recesses 53Ba and 53Ba (one shown in figure) are formed on the underside of the floor wall 53B of the cap main body 50B, and an engagement surface 53Bb is formed on the upper surface of the floor wall 53B.

Figure 11A:
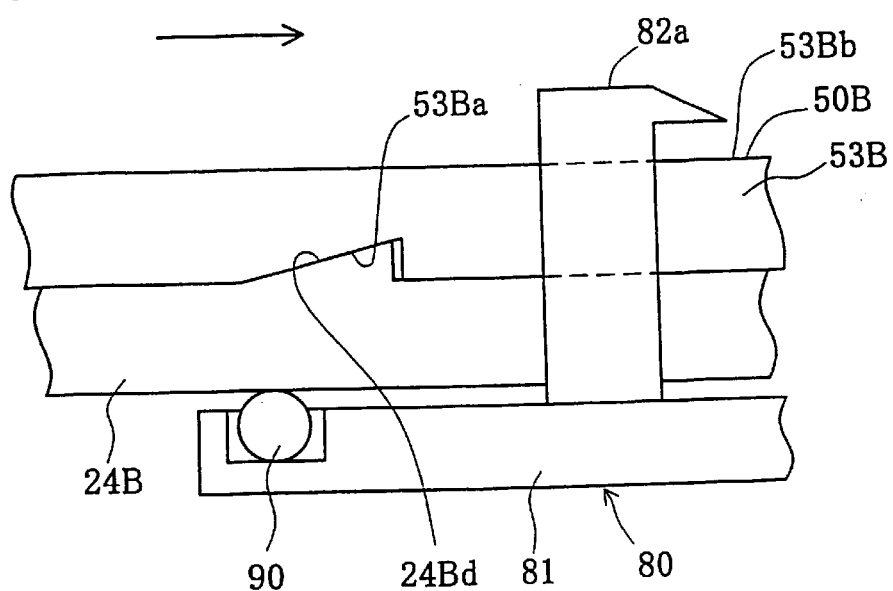
FIG. 11A illustrates an enlarged view of the cap main body and shutter of the fueling device of the second embodiment in an unsealed state.
Figure 11B:
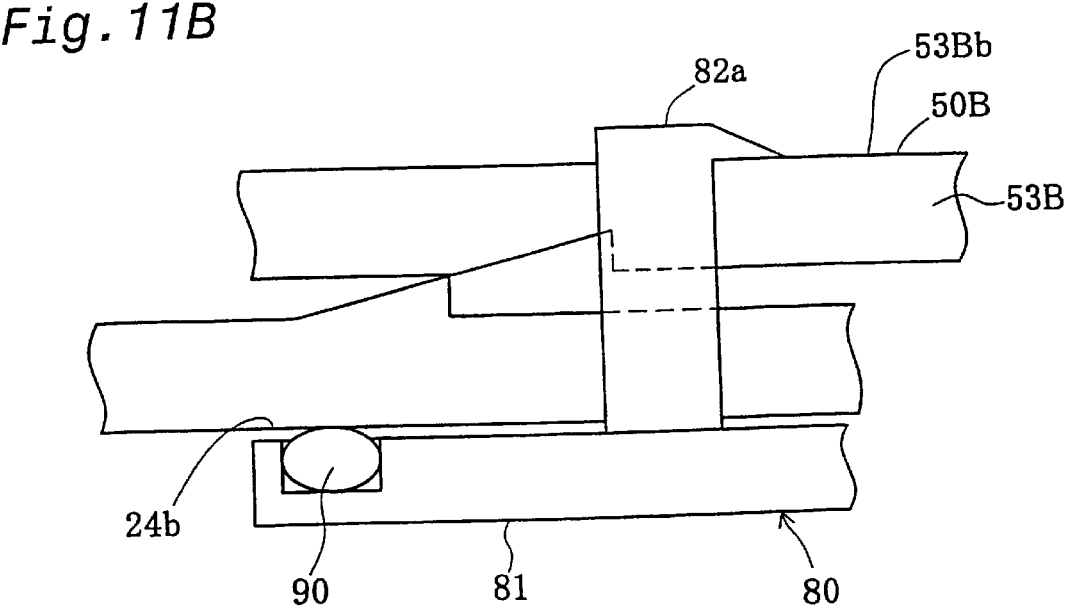
FIG. 11B is an enlarged view similar to FIG. 11A, but depicting the main body in a sealed state.

FIGS. 11A and 11B illustrate the engagement of the cap main body 50B and shutter 80. The inclined recesses 53Ba are operatively associated with the cam surfaces 24Bd, and, as shown in FIG. 11A, are fitted with the cam surfaces 24Bd while the cap main body 50B is inserted. Meanwhile, as shown in FIG. 11B, as the cap main body 50B is rotated in the closed direction, the recesses 53Ba ride up the cam surfaces 24Bd.

When the cap main body 50B inserted to close the passage, the inclined recesses 53Ba of the cap main body 50B are fitted with the cam surfaces 24Bd (FIG. 11A). When the cap main body 50B is rotated clockwise (direction of arrow) from this state, the shallow portion of the inclined recesses 53Ba rides up over the cam surfaces 24Bd, travelling upward as the cap main body 50B is rotated. As the cap main body 50B moves, the engagement catches 82a and 82a engage the engagement surfaces 53Bb of the cap main body 50B, and the shutter main body 81 is lifted up via the engagement catches 82a. The seal ring 90 is thus pressed to the seat surface 24b, providing high sealing properties. The fueling device 10B thus provides the same effects as that in the first embodiment.

Figure 12:
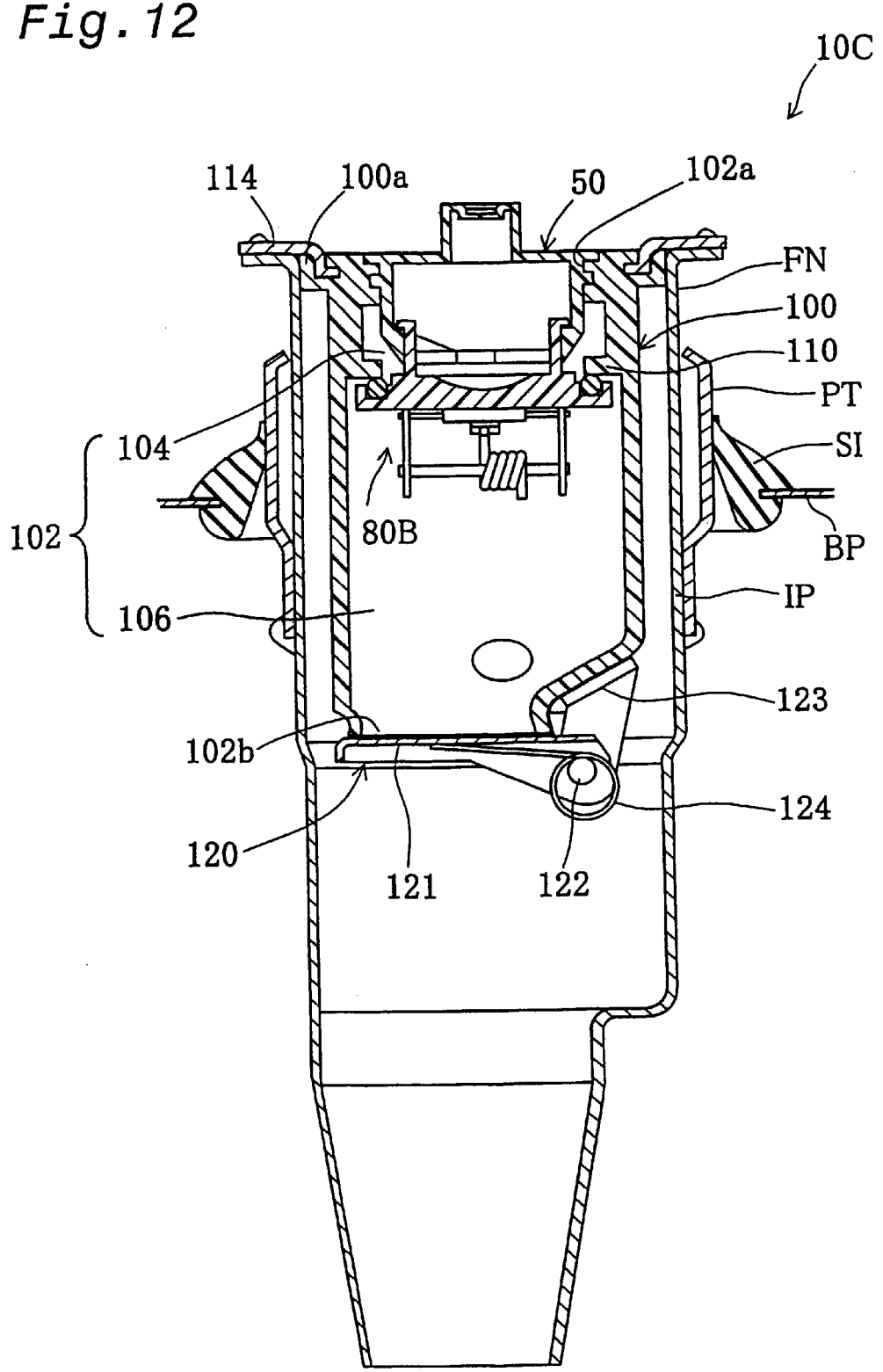
FIG. 12 is a cross section depicting the fueling device in accordance with a third embodiment.

FIG. 12 is a cross section of a fueling device 10C in accordance with a third embodiment. The fueling device 10C comprises a casing main body 100 disposed in the inlet pipe IP. The casing main body 100 houses the cap main body 50, a first shutter 80B, and a second shutter 120.

The casing main body 100 is disposed in the inlet pipe IP, and is fixed at a flange 100a at the top to the filler neck FN by way of a connecting plate 114. That is, the inner periphery of the connecting plate 114 is united by means of insert molding with the flange 100a at the top of the casing main body 100, and the outer periphery is bonded by butt welding to the top of the filler neck FN.

A partition wall 110 protrudes on the casing main body 100, the upper part of the housing chamber 102 serving as an upper chamber 104, and the lower part serving as a lower chamber 106. The cap main body 50 and first shutter 80B have the same structures as those in the first embodiment.

The second shutter 120 at the bottom of the casing main body 100 comprises a shutter main body 121, shaft 122, attachment component 123, and spring 124. The shutter main body 121 is provided in such a way as to open and close the lower opening 102b of the casing main body 100. That is, the attachment component 123 is attached to the bottom of the casing main body 100, and the shutter main body 121 is pivotally supported via the shaft 122 by the attachment component 123. In this structure, the shutter main body 121 closes the lower opening 102b by means of the urging force of the spring 124.

The outer periphery of the inlet pipe IP is provided with an external seal component SI, body plate BP, and protector PT.

In the fueling device 10C, the fuel gun is inserted through the upper opening 102a of the casing main body 100 while the cap main body 50 is open, and the first shutter 80B and second shutter 120 open the passage for fueling.

To attach the fueling device 10C to the filler neck FN, the connecting plate 114 unified by means of insert molding with the casing main body 100 is butt welded to the end of the filler neck FN. Thus, in fueling device 10C, the casing main body 100 is united by welding with the filler neck FN to seal the interior of the filler neck FN against the outside environment, resulting in better sealing properties than the fueling device of the first embodiment, with no need for a gasket around the outer periphery of the casing main body 100.

Figure 13:
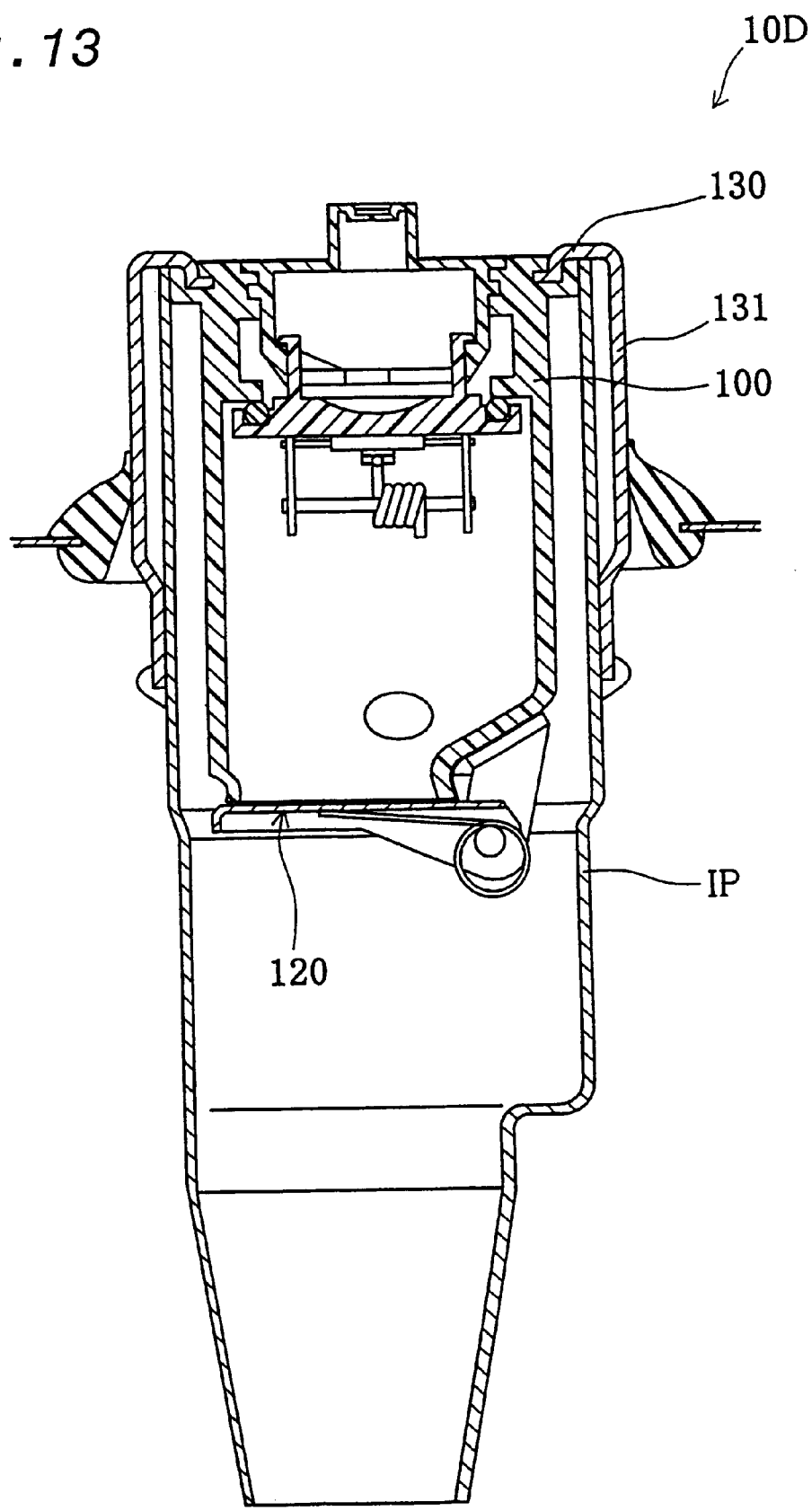
FIG. 13 is a cross section depicting a variation of the fueling device of FIG. 12.

FIG. 13 is a cross section depicting the fueling device 10D in a variant of FIG. 12. The fueling device 10D is characterized by a structure in which a connecting component 130 is unitarily formed with the protector. That is, the connecting component 130 is cylindrical, comprising a protector 131 covering the outer periphery of the filler neck FN. The top of the connecting component 130 is bent inward and is insert molded with the casing main body 100. The entire periphery at the bottom end of the protector 131 is welded to the filler neck FN. The function of the protector 131 is thus taken on by the connecting component 130, thereby allowing the number of parts to be reduced.

Figure 14:
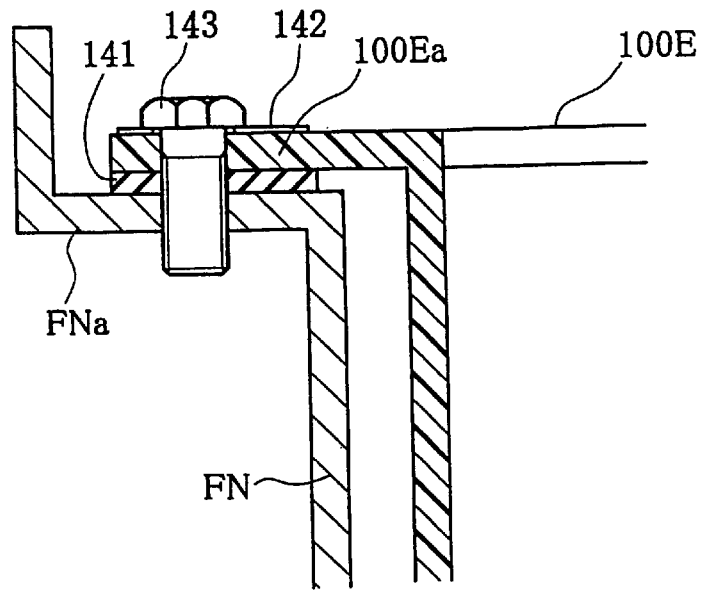
FIG. 14 is an enlarged cross section of the main parts of another variant of FIG. 12.

FIG. 14 is a cross section of the main parts of another variant of FIG. 12, wherein the filler neck FN and casing main body 100E are combined by another technique. In FIG. 14, an outwardly extending flange FNa is formed at the top of the filler neck FN. Additionally, a flange 100Ea disposed above the filler neck FN is formed at the top of the casing main body 100. The flange FNa and flange 100Ea are joined by a bolt 143. Packing 141 and a washer 142 are positioned between the flanges FNa and 100Ea. The filler neck FN and the casing main body 100 are sealed by the packing 141 made of rubber, and are combined when the bolt 143 is tightened.

Figure 15:
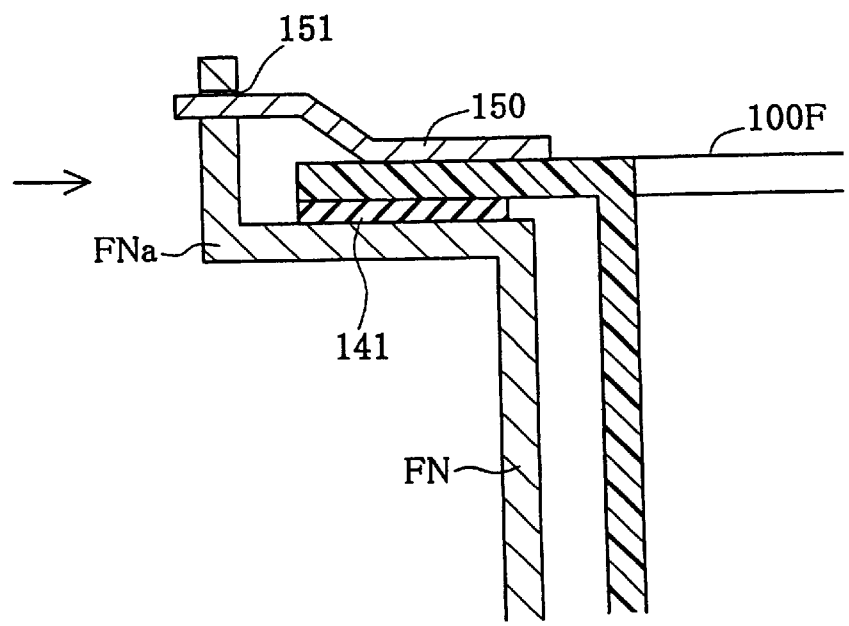
FIG. 15 is an illustration of a variation of FIG. 14.
Figure 16:
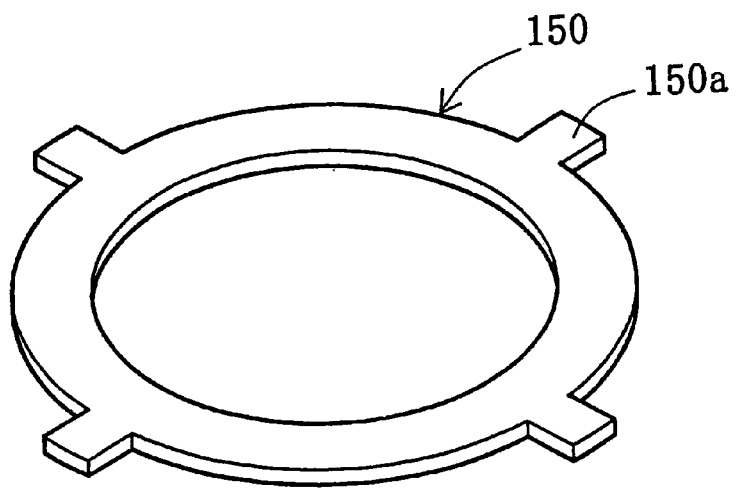
FIG. 16 is an oblique view of a retaining ring of FIG. 15.
Figure 17:
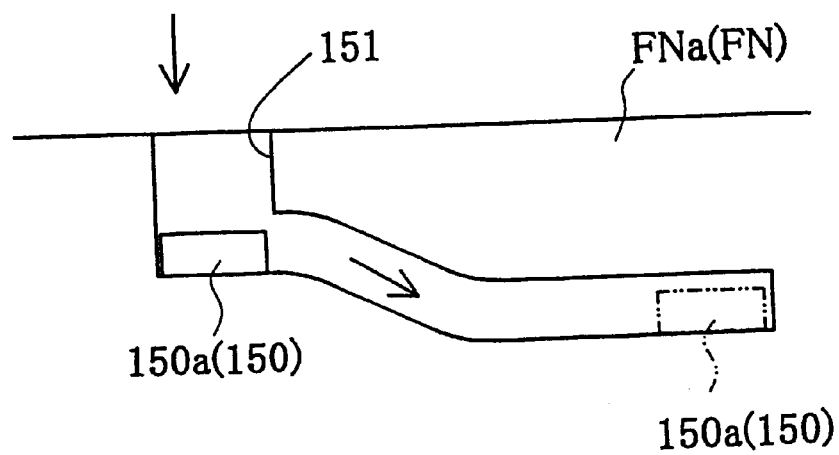
FIG. 17 is a view as seen from the direction of the arrow in FIG. 15.

FIG. 15 is an example using a fixture instead of a bolt in a variant of FIG. 14. In FIG. 15, the variant comprises a retaining ring 150 fixed from above the casing main body 100F against the filler neck FN. As shown in FIG. 16, the retaining ring 150 has engagement catches 150a at four locations around the periphery of the ring 150. FIG. 17 is a view taken along the direction of the arrow in FIG. 15. As shown in FIG. 17, an engagement groove 151 engaged by the engagement catches 150a is formed in the flange FNa of the filler neck FN. In this structure, the engagement catches 150a are inserted into the engagement groove 151 while the packing 141 and the flange 100Fa of the casing main body 100F are on the flange FNa of the filler neck FN, and the retaining ring 150 is rotated, so that the retaining ring 150 presses the packing 141 via the flange 100Fa of the casing main body 100F, thereby providing a seal.

The following are examples of other variants.

Figure 18:
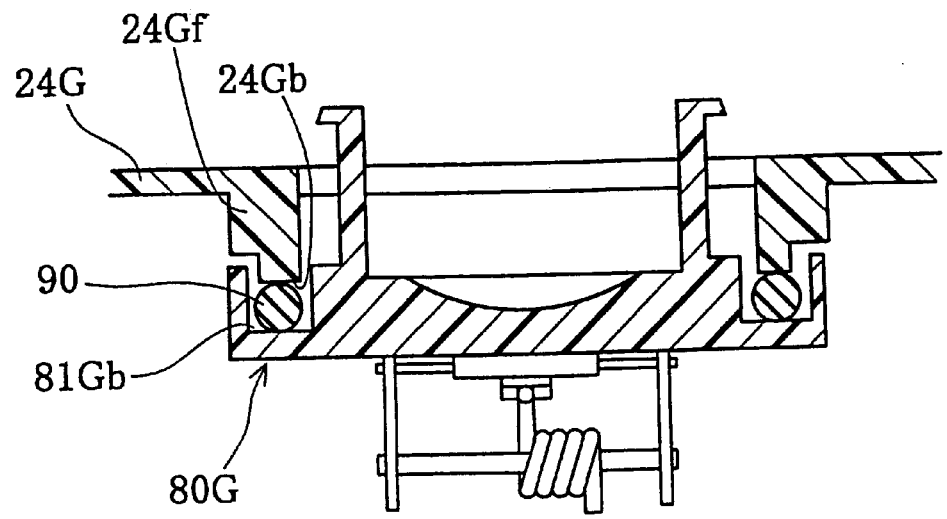
FIG. 18 is a cross section of the periphery of the shutter in accordance with a fourth embodiment.

1) FIG. 18 is an illustration of the shutter 80G in accordance with a fourth embodiment. In FIG. 18, a deep annular recess 81Gb is formed in the upper surface of the shutter 80G. The seal ring 90 is housed in the annular recess 81Gb. Meanwhile, the seat surface 24Gb pressed against the seal ring 90 is formed as a step on a protrusion 24Gf protruding from the underside of the partition wall 24G. In this structure, the seal ring 90 is housed in the deep annular recess 81Gb, and thus lasts longer, without being damaged by collisions with the fuel gun.

Figure 19:
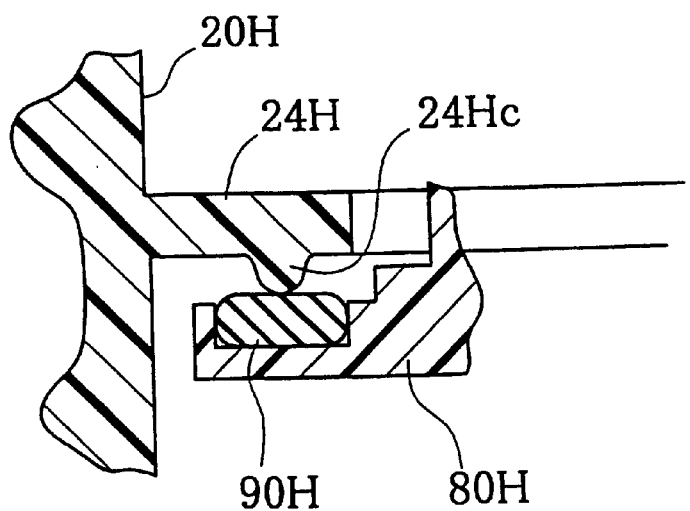
FIG. 19 is a cross section of the periphery of the shutter in accordance with a fifth embodiment.

2) FIG. 19 illustrates the periphery of the shutter 80H and seat surface in a fifth embodiment. In FIG. 19, an annular protrusion 24Hc is formed on the partition wall 24H of the casing main body 20H. The curved surface of the annular protrusion 24Hc serves as the seat surface. A seal ring 90H with a flat cross section is attached to the shutter 80H. In this structure, the seat surface at the tip of the annular protrusion 24Hc provides a seal in linear contact with the seal ring 90H, thus providing better sealing properties.

3) In the first embodiment shown in FIGS. 1–9, the structure includes the seal ring 90 retained by the shutter 80, and the seat surface 24b is formed on the partition wall 24 of the casing main body 20. The invention is not limited to this arrangement, however. The seal ring may be fixed on the partition wall of the casing main body, and the seat surface may be formed on the shutter.

Figure 20A:
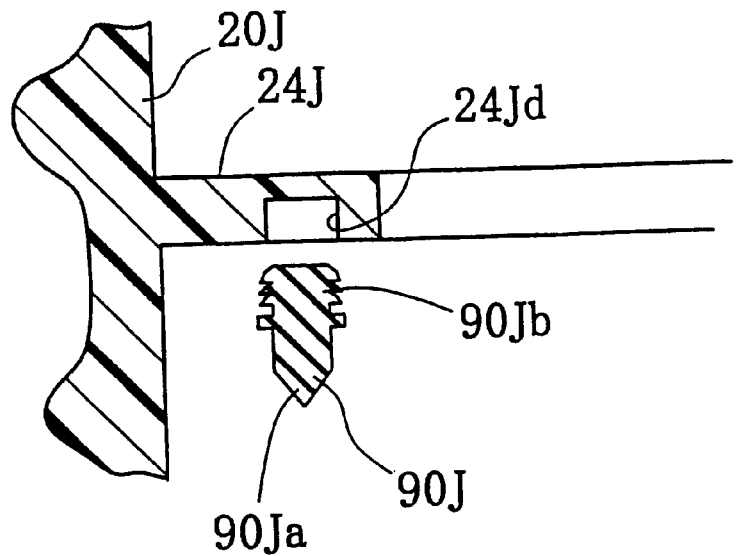
FIGS. 20A and 20B are illustrations of the shutter in accordance with a sixth embodiment.
Figure 20B:
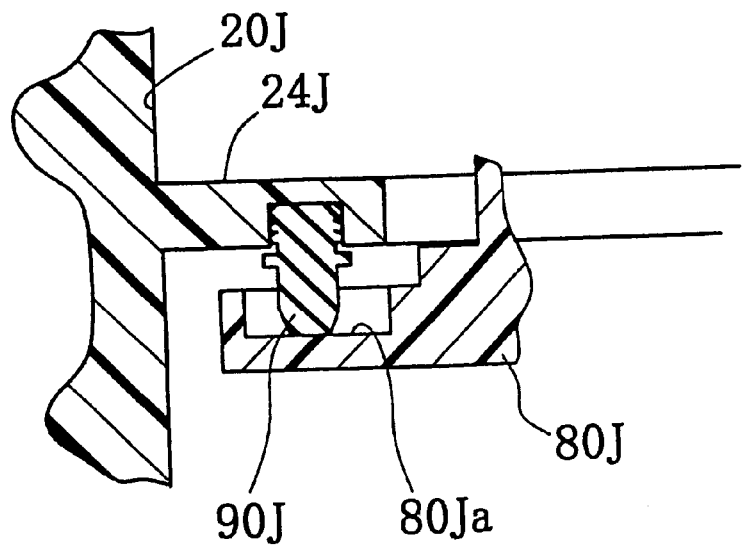

FIG. 20A and 20B illustrate a sixth embodiment, in which the seal ring 90J is attached to the side of the casing main body 20J. As shown in FIG. 20A, an attachment recess 24Jd is formed facing downward in the partition wall 24J of the casing main body 20J, and the seal ring 90J is attached to the attachment recess 24Jd. An annular stepped portion 90Jb is formed around the top of shutter 80J, and is pressed into the attachment recess 24Jd to prevent the seal ring 90J from falling out of the attachment recess 24Jd. As shown in FIG. 20B, the bottom tip 90Ja of the seal ring 90J is tapered, and seals against the seat surface 80Ja around the shutter 80J. The seal ring 90J is thus attached to the casing main body 20J, and the same effects are achieved, despite the formation of the seat surface 80Ja on the shutter 80J. In this case, the seat surface 80Ja is more recessed than the upper surface of the shutter 80J, and is formed so that the sealing 90J will not come into contact with the fuel gun, thus avoiding any damage potentially caused by the insertion of the fuel gun.

4) The seal ring may be dispensed with, and at least a portion of the partition wall or shutter may be formed of an elastic material. By dispensing with the seal ring, the number of parts is reduced.

5) In the first embodiment, closing the cap 50 with the handle 57 causes the catches 82a to be engaged, which applies a force to the shutter in the closing direction. As a variation to this embodiment, female threading can be formed in the top of the shutter or female threading can be formed in the cap to replace the engagement catches so that the shutter and cap can be screwed by rotating the cap. Thus, screw engaging the cap to the shutter wall enhances the sealability.

Figure 21:
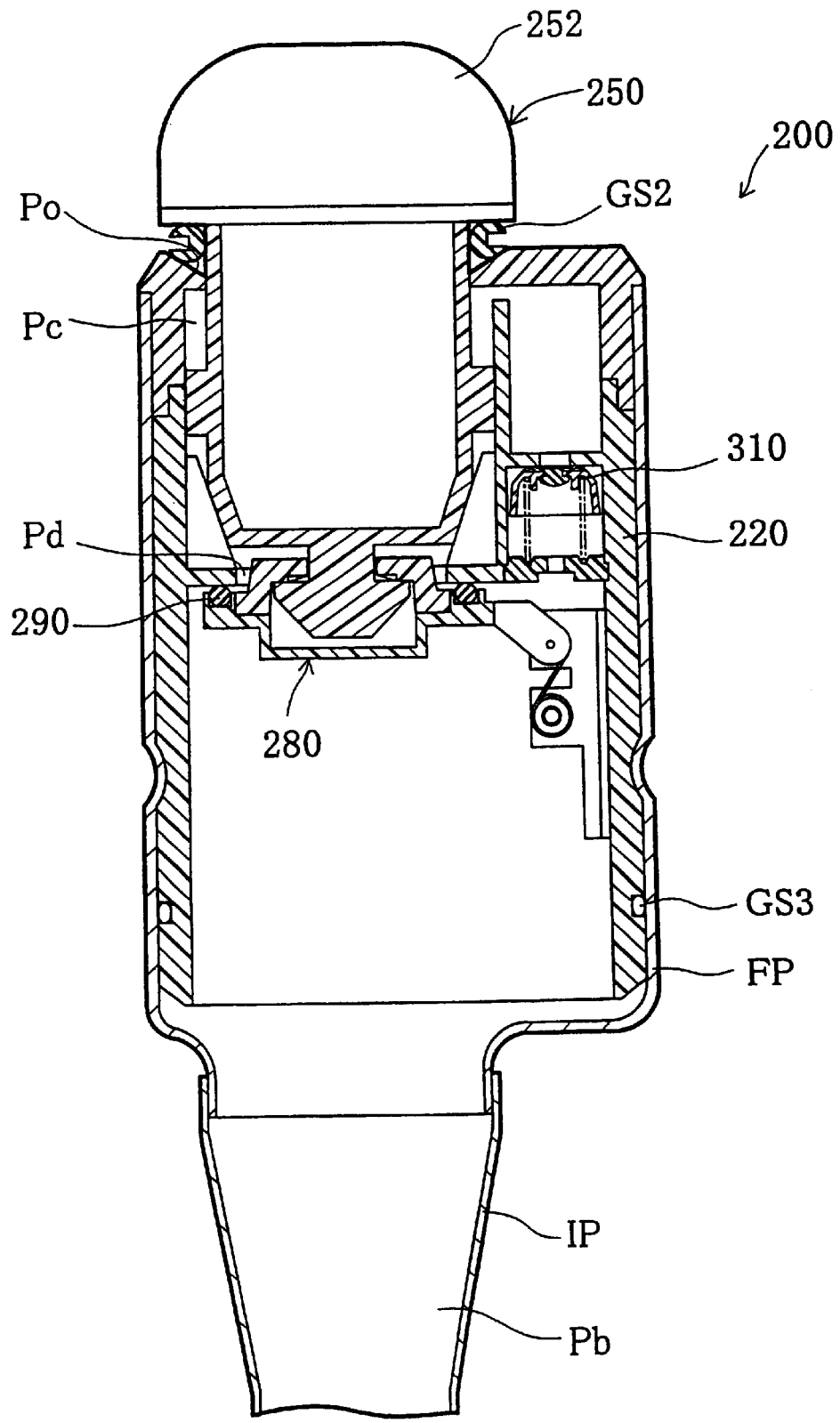
FIG. 21 is a cross section of a fueling device in accordance with a seventh embodiment.
Figure 22:
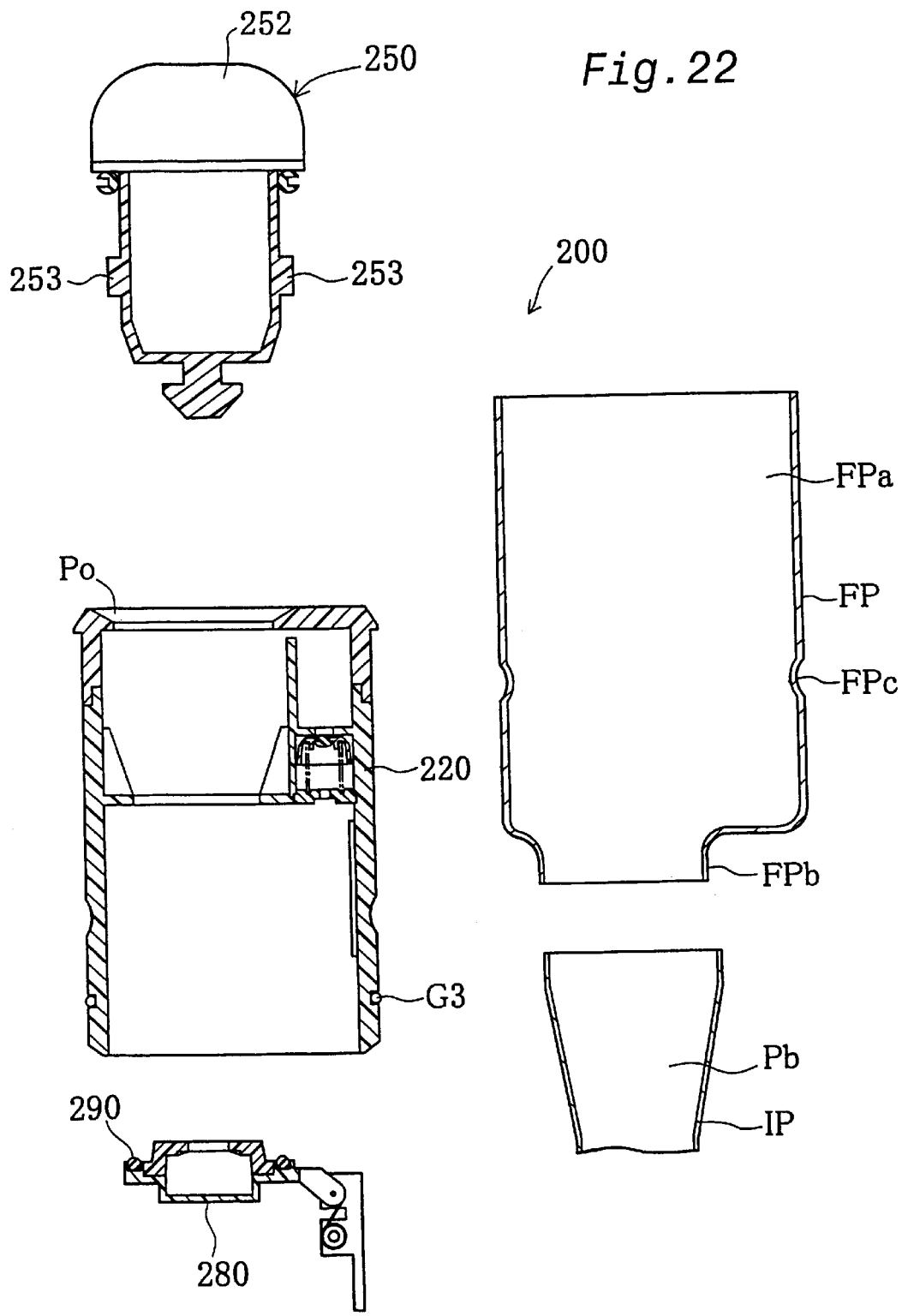
FIG. 22 is a cross section depicting an exploded view of the structural components of the fueling device of the seventh embodiment.
Figure 23:
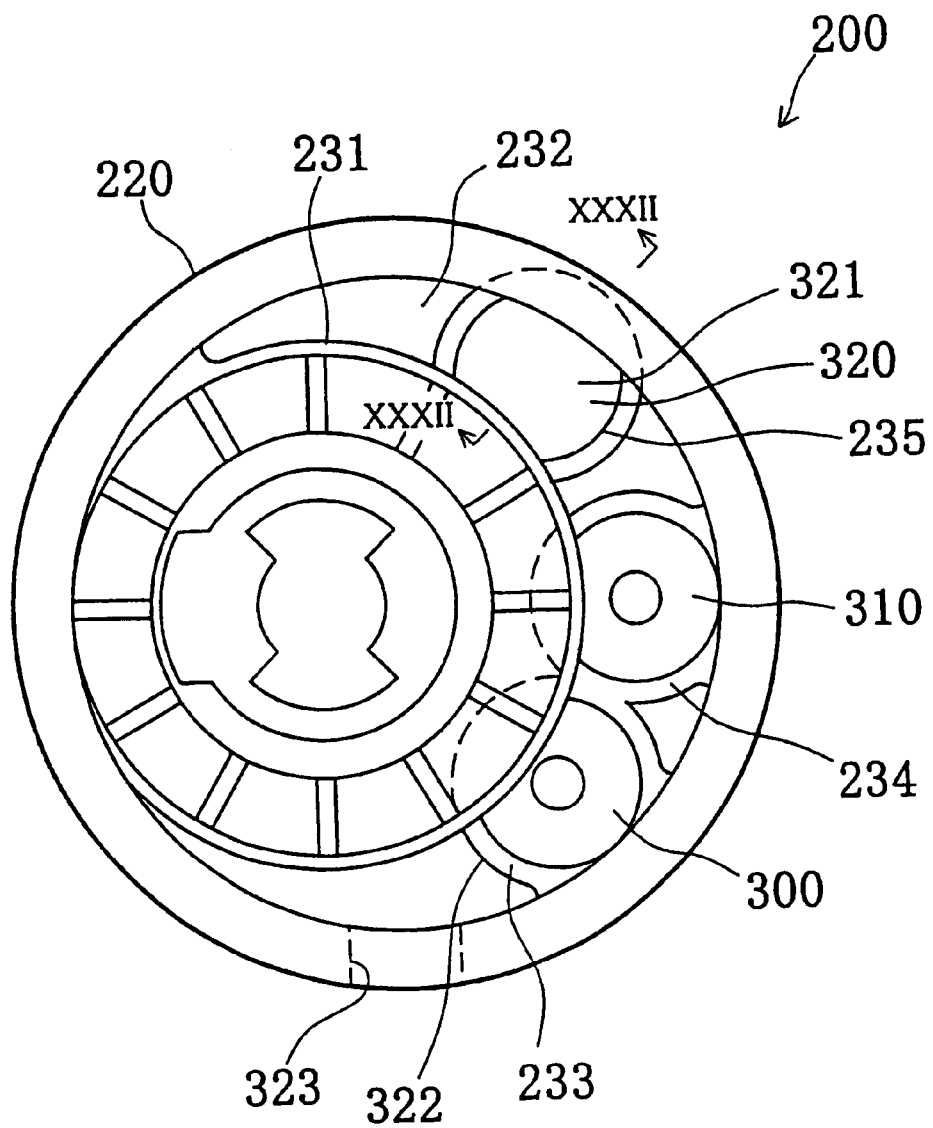
FIG. 23 is a plan of the fueling device of the seventh embodiment.

A fueling device in accordance with a seventh embodiment is described below. FIG. 21 is a cross section of a vehicle (e.g., automobile) fueling device 200 of the seventh embodiment, FIG. 22 is a cross section depicting an exploded view of the structural components of the fueling device 200, and FIG. 23 is a plan of the fueling device 200. The fueling device 200 of this embodiment is characterized by a connector that connects the cap main body 250 and shutter 280, and a guiding structure for guiding the fuel gun.

In FIGS. 21 through 23, the fueling device 200 is attached to an inlet pipe (fuel filler pipe) supplying fuel to the fuel tank (not shown in figure). The fueling device 200 comprises a neck pipe FP attached to the top of an inlet pipe IP, a casing 220 housed in the neck pipe FP, a cap main body 250 that is detachably mounted on the casing 220 for opening and closing the inlet opening Po, a shutter 280 attached inside the casing 220, a seal ring 290 engaged with the shutter 280, and a gasket GS2 coupled with the cap main body 250. As shown in FIG. 23, the fueling device 200 further comprises a positive pressure valve 300 and negative pressure valve 310 as regulating valves for regulating the pressure in the fuel tank, and an atmosphere releasing passage 320 connected to a canister (not shown in figure).

When the cap main body 250 of the fueling device 200 closes off the inlet opening Po (see FIG. 21), the pressure in the fuel tank is regulated by the positive pressure valve 300 and negative pressure valve 310 to maintain the pressure within a predetermined range. Meanwhile, during fueling, the cap main body 250 is removed from the casing 220 to open the inlet opening Po, the fuel gun (not shown) is inserted through the inlet opening Po, the shutter 280 is pushed open, and fuel is supplied to the fuel tank. The fueling device 200 thus regulates the pressure in the fuel tank and secures the fuel passage during fueling. The structure of the parts of the fueling device 200 of this embodiment are described in detail below.

As shown in FIG. 22, the neck pipe FP is a metal cylinder welded to the top of the inlet pipe IP. The neck pipe FP has a housing chamber FPa and a connected pipe FPb. The connected pipe FPb narrows and is connected to the fuel passage Pb of the inlet pipe IP at the bottom of the housing chamber FPa.

Figure 24:
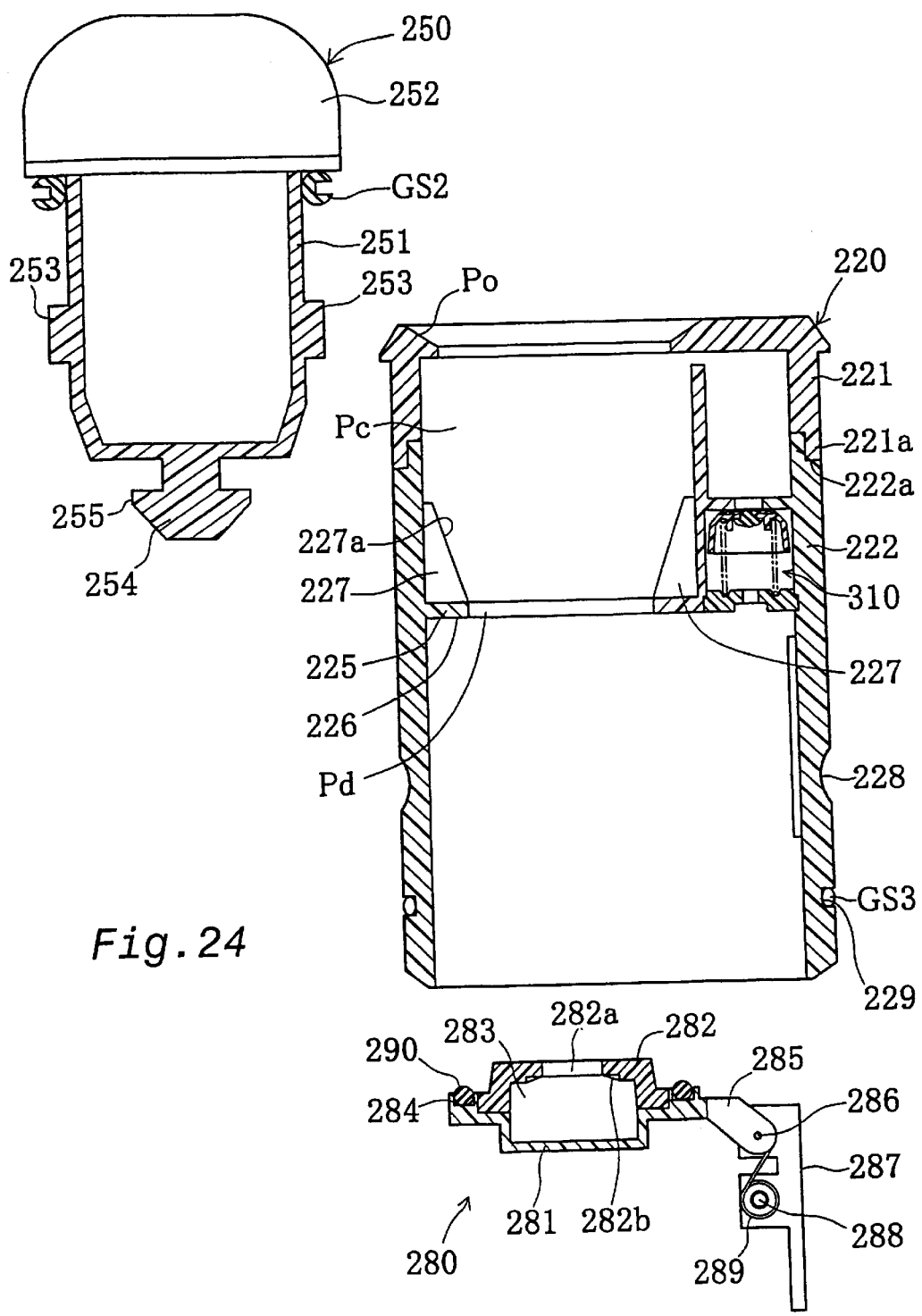
FIG. 24 is an enlarged cross section of the casing, cap main body, and shutter depicted in FIG. 22.

The casing 220 is housed in the housing chamber FPa of the inlet pipe IP. FIG. 24 is an enlarged cross section of the casing 220, cap main body 250, and shutter 280. Referring to FIG. 24, the casing 220 comprises an upper case 221 and lower case 222, which are formed in the shape of a unified cylinder by welded at welding steps 221a and 222a. An opening side passage Pc is formed in the upper case 221 and lower case 222. The top of the opening side passage Pc serves as the inlet opening Po for the insertion of the cap main body 250. A seat wall 225 protruding from the inner wall of the lower case 222 is formed midway in the opening side passage Pc. The opening side passage Pc communicates with a seal opening Pd at the seat wall 225. A seat surface 226 extends along the bottom wall surface of the seat wall 225. Guide protrusions 227 disposed in the axial direction and equidistantly in the peripheral direction are formed on the inner peripheral wall of the casing 220. The inner surfaces of the guide protrusions 227 form a guide surface 227a continuously tapering away from the seal opening Pd. The guide surface 227a is a surface by which the tip of the fuel gun is guided through the inlet opening Po toward the seal opening Pd.

An annular fixing recess 228 is formed in the outer wall of the lower case 222. A detent annular recess FPc (see FIG. 22) of the neck pipe FP is pressed into the annular fixing recess 228, allowing the lower case 222 to be fixed to the neck pipe FP. An annular housing recess 229 is furthermore formed around the outer wall of the lower case 222 below the annular fixing recess 228, so as to retain gasket GS3. The gasket GS3 seals the space between the casing 220 and the neck pipe FP.

Figure 25:
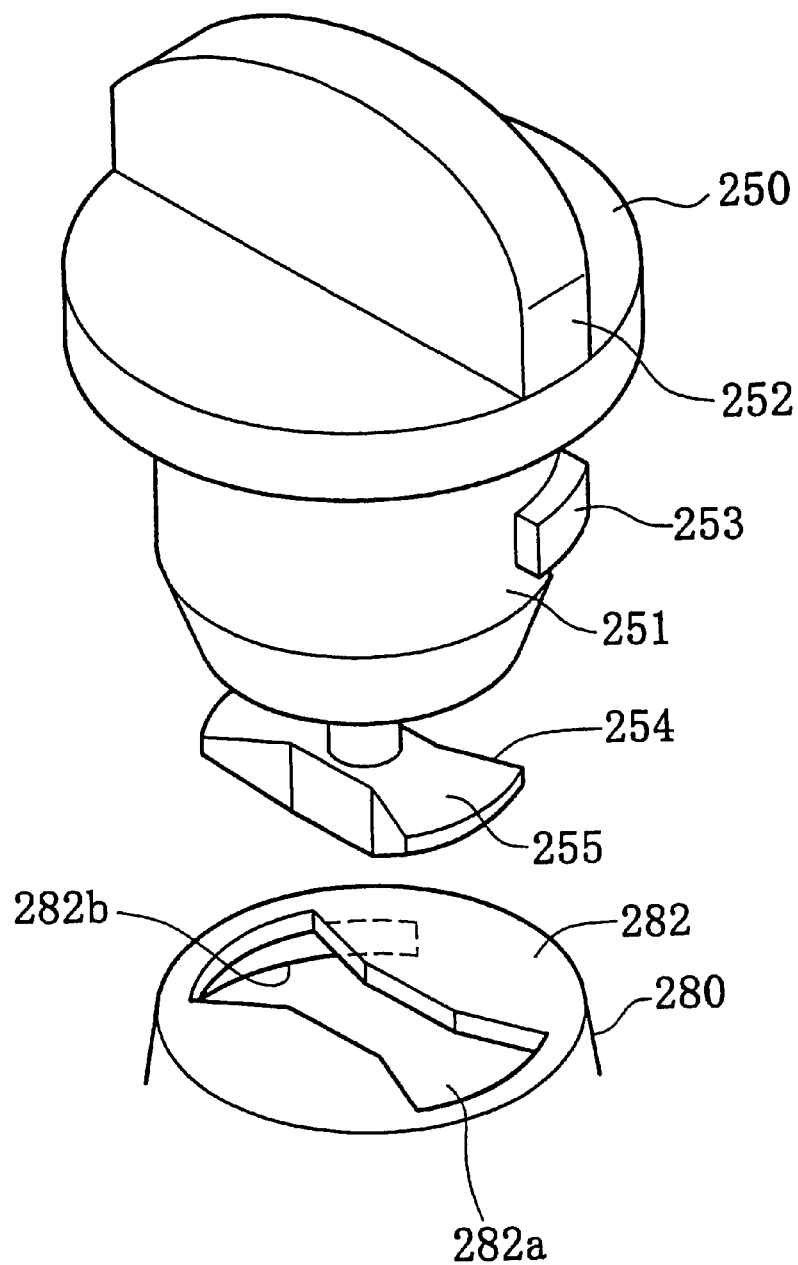
FIG. 25 is an oblique view of the upper surface of the shutter and the cap main body.
Figure 26A:
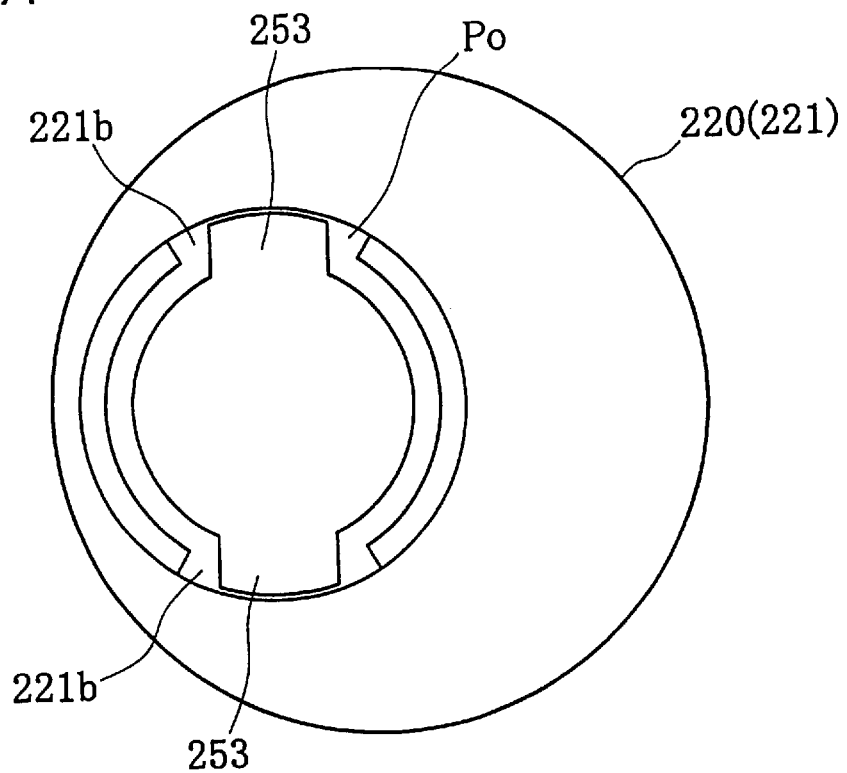
FIGS. 26A and 26B illustrate the positional relationship, as seen from above, between the cap main body and the casing.
Figure 26B:
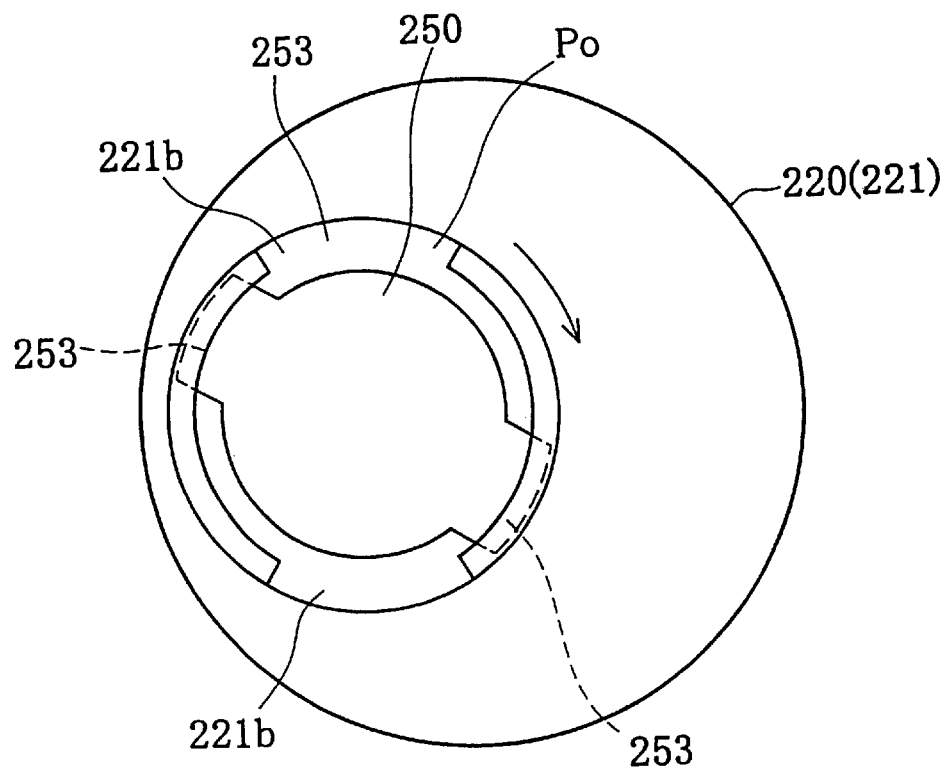

The cap main body 250 is attached to the casing 220 so as to close the opening side passage Pc, and the sealing properties relative to the seat surface 226 are enhanced by the seal ring 290 coupled with the shutter 280. FIG. 25 is an oblique view of the upper surface of the shutter 280 and the cap main body 250. The cap main body 250 comprises a cylinder 251 and a handle 252 unitarily formed with the top of the cylinder 251. Lock protrusions 253 and 253 protrude at two locations from the side wall of the cylinder 251. FIGS. 26A and 26B illustrate the positional relationship, as seen from above, between the cap main body 250 and casing 220. FIG. 26A illustrates the state immediately after the insertion of the cap main body 250, and FIG. 26B illustrates the state after rotation of the cap main body 250. As shown in FIGS. 26A and 26B, the opening edge of the inlet opening Po of the upper case 221 comprises partially notched inserts 221b and 221b. These notched inserts 221b and 221b are formed so as to allow the insertion of the lock protrusions 253 and 253 of the cap main body 250. During rotation of the cap main body 250, the lock protrusions 253 and 253 come into contact with the stopper (not shown in figure) formed in the inside wall of the casing 220, preventing the cap main body 250 from being rotated beyond a predetermined angle.

In FIG. 24, the shutter 280 is a member for opening and closing the seal opening Pd. The shutter 280 comprises a pot-shaped shutter main body 281, and an engagement lid 282 covering the shutter main body 281 from above. The shutter main body 281 and the engagement lid 282 are hot welded around the outer periphery, so that an engagement chamber 283 is formed therebetween. An annular recess 284 is also formed around the outer periphery of the shutter main body 281, and the seal ring 290 is retained in this annular recess 284. The seal ring 290 attaches to and detaches from the seat surface 226. A hinge 285 is provided at the end of the shutter main body 281. The hinge 285 is rotatably supported against a rotating support 287 fixed to the casing 220 by way of a shaft 286. The rotating support 287 rotatably supports the shutter 280. A spring 289 is held about shaft 288. The spring 289 is a torque spring, and urges the shutter 280 in the closing direction.

Figure 27:
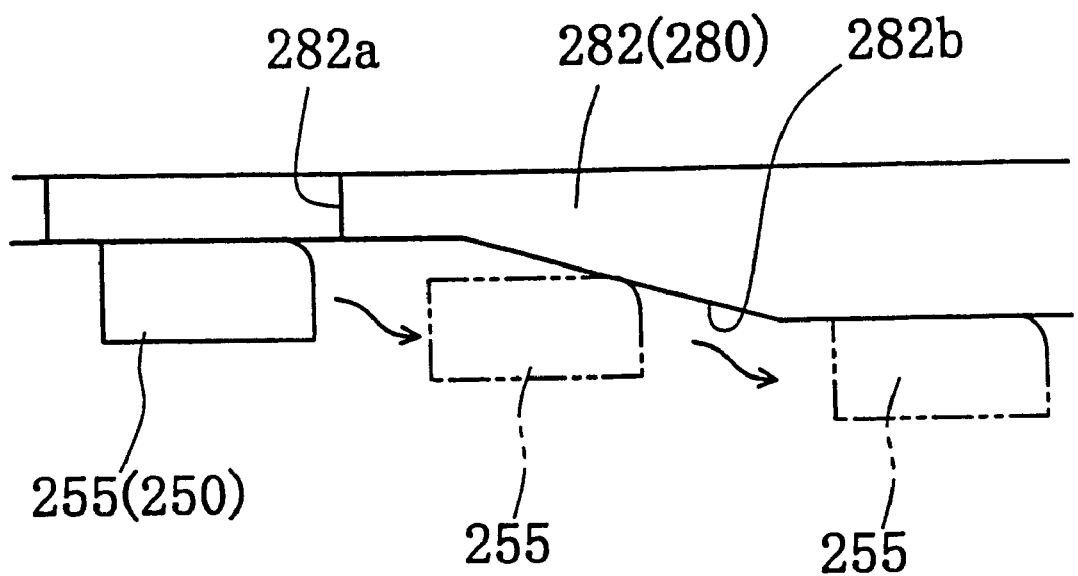
FIG. 27 illustrates the operation of the connector of the fueling device of the seventh embodiment.

FIG. 25 depicts connector whereby the force exerted by the cap main body 250 in the rotating direction at the bottom of the cap main body 250 is converted into force allowing the shutter 280 to close the seal opening Pd. An engagement projection 254 protrudes from the bottom of the cap main body 250. The engagement projection 254 comprises a boat-shaped tip engagement component 255. An insertion hole 282a sized and configured to allow for the insertion of the tip engagement component 255 is formed on the engagement lid 282 of the shutter 280. FIG. 27 illustrates the operation of the connector. A cam surface 282b is formed on the underside of the engagement lid 282. The cam surface 282b forms a gradually downward facing slope. As the cap main body 250 is turned clockwise approximately 90° about the longitudinal direction of the insertion hole 282a, the upper surface of the tip engagement component 255 moves along the cam surface 282b. The cap main body 250 is thereby restrained by the casing 220, and the shutter 280 presses against the seat surface 226.

As shown in FIG. 21, the gasket GS2 is attached to the bottom of the handle 252 of the cap main body 250. The gasket GS2 seals the space between the cap main body 250 and the inlet opening Po of the casing 220.

Figure 28:
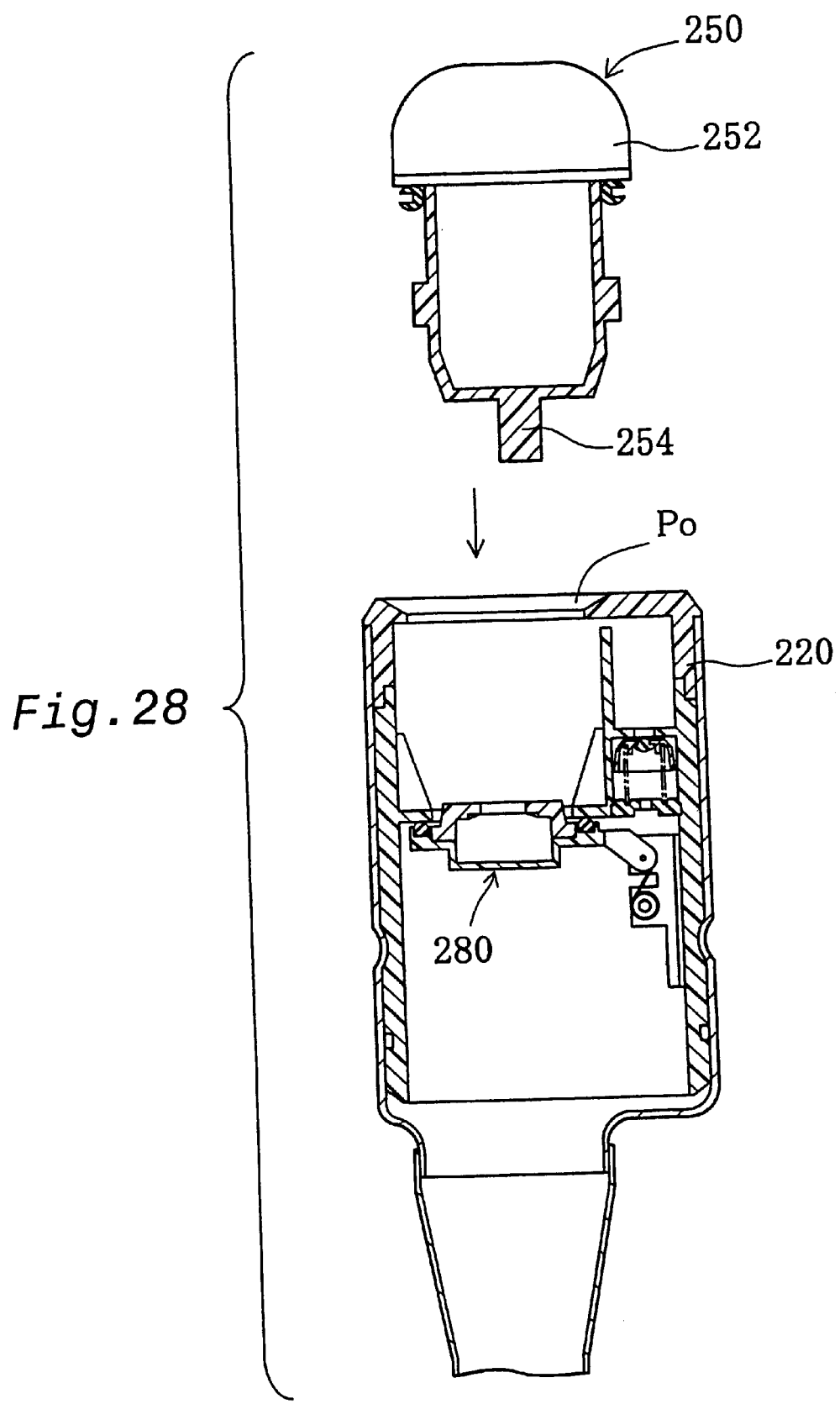
FIG. 28 is a cross section of the cap main body in a removed state.

The opening and closing operations for the cap main body 250 of the fueling device 200 are described below. FIG. 28 is a cross section of the cap main body 250 while removed. From the removed state depicted in FIG. 28, the cap main body 250 is inserted by means of the handle 252 into the inlet opening Po of the casing 220. At this time, as shown in FIG. 26A, the lock protrusions 253 are aligned with the inserts 221b. The tip engagement component 255 of the cap main body 250 is thus inserted into the insertion hole 282a of the shutter 280, as shown in FIG. 27. When the cap main body 250 is rotated clockwise about 90°, the tip engagement component 255 rides on the cam surface 282b, pressing the seal ring 290 of the shutter 280 against the seat surface 226 (state shown in FIG. 21) as the tip engagement component 255 is pulled by the engagement lid 282. Cooperation between the shutter 280 and seal ring 290 seals the seal opening Pd in an air-tight state, and the cap main body 250 closes the inlet opening Po.

At the same time, the gasket GS2 attached to the cap main body 250 seals against the periphery of the inlet opening Po, and the fuel passage Pa is thus double sealed against the exterior, resulting in a high degree of air tightness.

To remove the cap main body 250 from the casing 220, the handle 252 is manually rotated counter-clockwise in the reverse direction to that depicted in FIG. 27. The tip engagement component 255 is positioned to be pulled through the insertion hole 282a. When the cap main body 250 is lifted up in the axial direction, the cap main body 250 is removed from the casing 220, thereby opening the opening side passage Pc to the outside. In this state, the shutter 280 is urged by the spring 289 into the closed position, with the seal ring 290 pressed to the seat surface 226.

Figure 29:
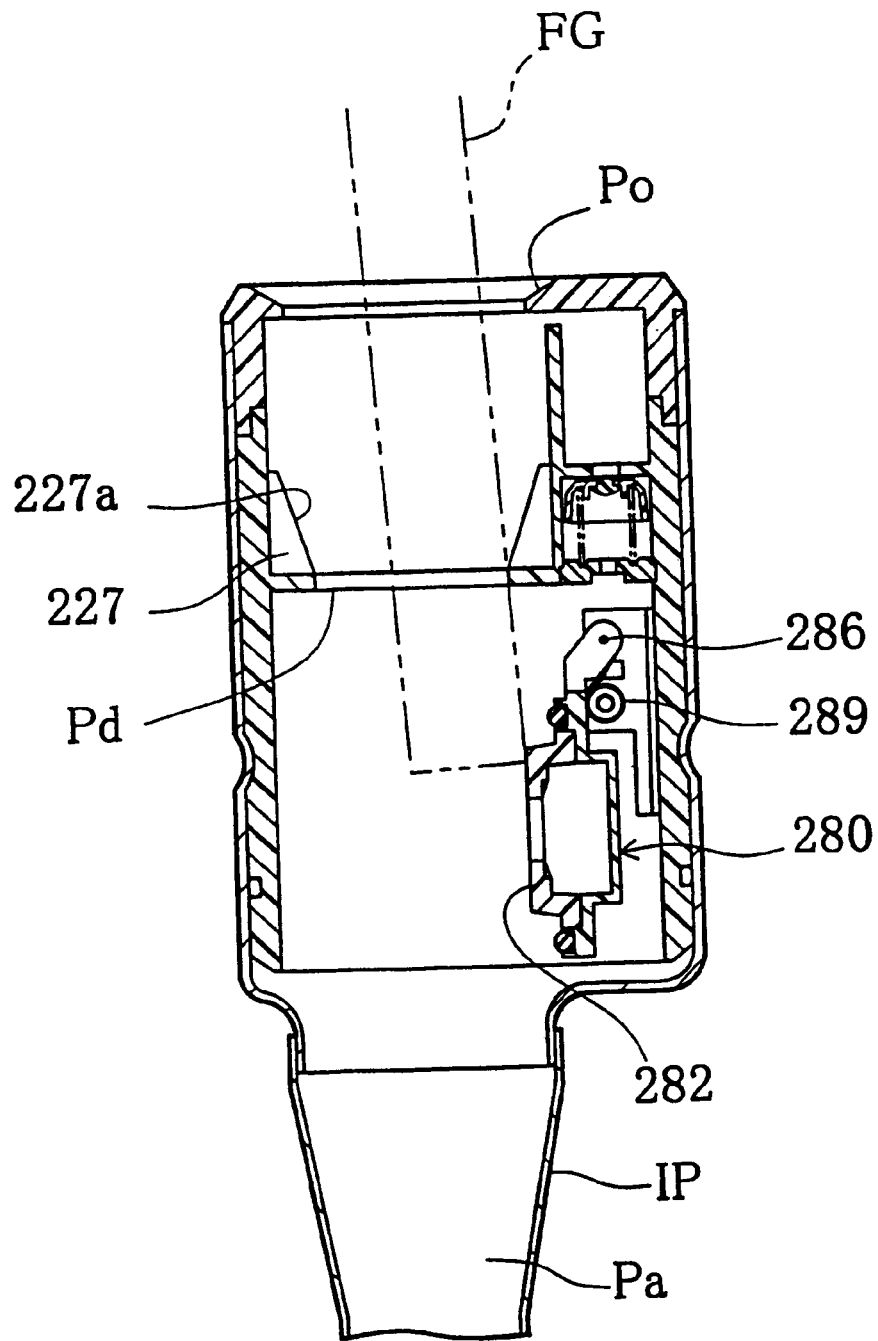
FIG. 29 illustrates the state of the fueling device of the seventh embodiment as the fueling device is being fueled by a fuel gun.

As shown in FIG. 29, when the fuel gun FG is inserted through the inlet opening Po, the tip of the fuel gun FG is guided by the guide surface 227a of the guide protrusions 227 into the seal opening Pd. When the fuel gun FG presses the upper surface of the engagement lid 282 of the shutter 280, the shutter 280 rotates counter-clockwise, pivoting about the shaft 286, against the urging force of the spring 289, and opens the opening Pd. The fuel from the fuel gun FG is thus supplied through the fuel passage Pb into the fuel tank. Upon the conclusion of fueling, the fuel gun FG is taken out, and the urging force of the spring 289 causes the shutter 280 to close the passage. Furthermore, as noted above, when the cap main body 250 is closed, the seal ring 290 of the shutter 280 is firmly pressed to the seat surface 226 to provide a seal, resulting in the state depicted in FIG. 21.

The aforementioned fueling device has the following merits.

1) When the cap main body 250 is rotated during fueling to close off the inlet opening Po, the rotating force of the cap main body 250 is converted into force in the direction in which the seal ring 290 is firmly pressed against the seat surface 226, so that the seal ring 290 seals the seat surface 226, thus providing high sealing properties between the interior of the fuel tank and the outside.

2) When the fuel gun FG is inserted into the inlet opening Po during fueling, the tip of the fuel gun FG is guided to the seal opening Pd by the guide surface 227a of the guide protrusions 227 formed as a continuous surface. The fuel gun FG can thus be inserted smoothly into the seal opening Pd without causing deformation through collisions with the peripheral edge of the seal opening Pd. The sealing properties are thus preserved, without deformation or the like of the seat surface 226 during fueling.

3) The upper surface of the shutter 280, that is, the upper surface of the engagement lid 282, is flat. The absence of engagement catches results in greater durability, since there are no engagement catches to be damaged by the fuel gun FG.

4) The engagement annular recess PFc is configured to be crimped in correspondence with the shape of the annular fixing recess 228, so that the gasket GS3 seals these ports in a simple manner.

5) Since the seat surface 226 is formed on the reverse side of the seat wall 225, where the seat surface 226 will not be struck by and will not be damaged by the fuel gun, thereby allowing the high sealing properties to be preserved.

6) Since the seal ring 290 is disposed on the inside of the casing main body 220, the diameter can be smaller than the gasket used in the conventional technique, in which the gasket is disposed on the outside of the casing main body. It is thus possible to further reduce the amount of fuel evaporating from the surface of the seal ring 290 due to fuel expansion.

7) The seal ring 290 is subject only to uniform compression force in the vertical direction between the shutter 280 and seat surface 226, not to any torque as the prior art, allowing uniform sealing force to be obtained, with better durability.

8) When the cap main body 250 is opened and closed, it is subject only to pressing force, but no substantial slip resistance from the seal ring 290, so that less torque is needed to manipulate the cap main body 50, with better manipulating properties.

Figure 33:
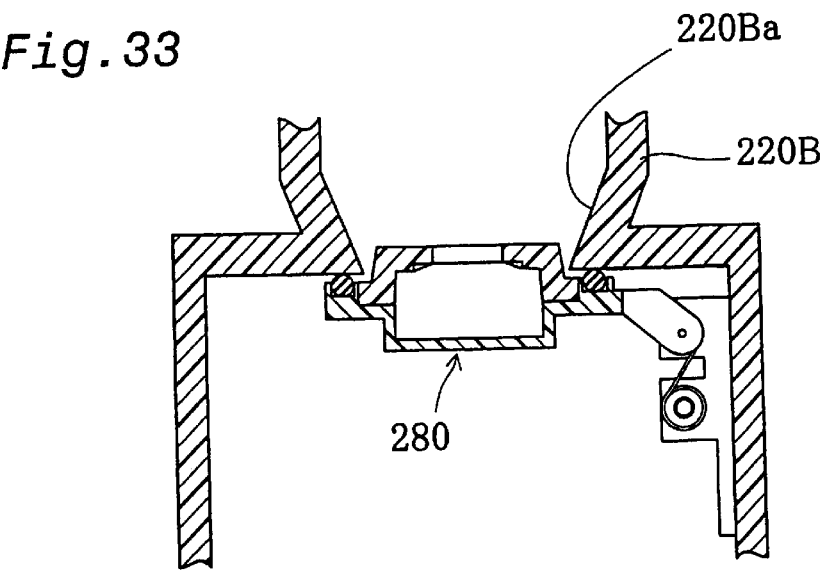
FIG. 33 is an illustration of a variation of the guide structure.

Another embodiment of the guide structure is shown in FIG. 33, in which a guide wall 220Ba is constructed so as to allow the fuel gun FG to be smoothly inserted. The guide wall 220Ba comprises the casing 220B tilted toward the seal opening Pd as shown in FIG. 33, instead of the structure comprising a plurality of guide protrusions 227 protruding from the inner wall of the casing as shown in FIG. 21 above.

As shown in FIG. 23, the fueling device 200 comprises an atmosphere releasing passage and pressure regulating valves in the casing 220. That is, a cylindrical partition tubular wall 231 is provided in the casing 220, and valve-forming members 233 and 234, as well as a passage-forming member 235, are disposed in the housing space 232 between the partition tubular wall 231 and the casing 220. A positive pressure valve 300 and negative pressure valve 310 are housed in the valve-forming members 233 and 234 respectively, while a portion of a passage for guiding external air to a canister is provided for the passage-forming member 235.

Figure 30:
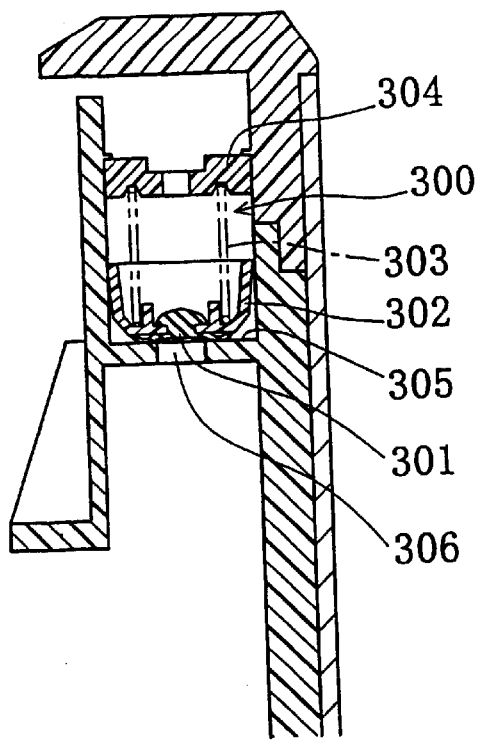
FIG. 30 is an enlarged cross section of a positive pressure valve.

FIG. 30 is an enlarged cross section of the positive valve 300. In FIG. 30, the positive valve 300 comprises a rubber valve body 301, valve support member 302 supporting the valve body 301, spring 303, and spring support 304. The valve body 301 is a rubber disc, which pressed against a seat surface 305, so as to open and close a through hole 306. The structure of the positive pressure valve 300 allows the internal pressure of the tank main unit to increase. When the difference in pressure from the atmospheric pressure applied to the valve body 301 is greater than the urging force of the spring 303, the valve body 301 opens, and when the difference is lower, the valve body closes. This allows the positive pressure valve 300 to keep the pressure in the tank unit below a predetermined pressure.

Figure 31:
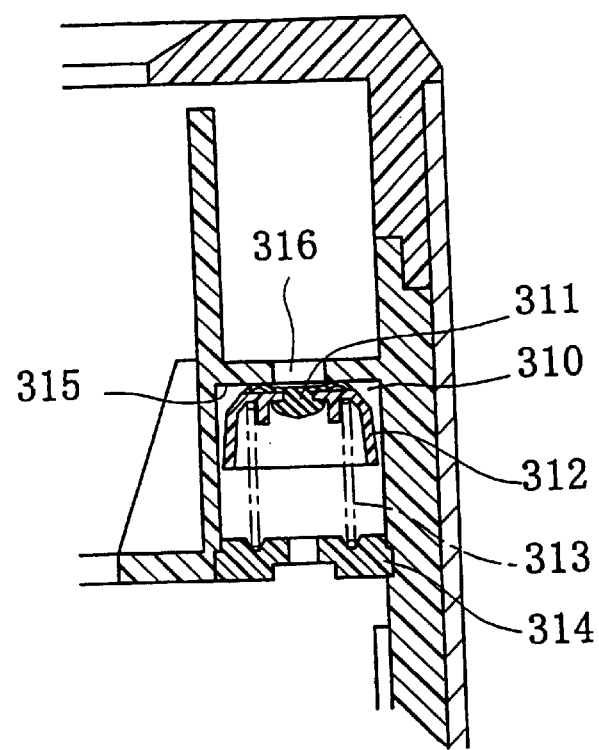
FIG. 31 is an enlarged cross section of a negative pressure valve.

FIG. 31 is an enlarged cross section of the negative pressure valve 310. The structure of the negative pressure valve 310 is different in that it is attached in the opposite direction from the positive pressure valve 300, but the structural components are virtually the same. That is, the negative pressure valve 310 comprises a rubber valve body 311, valve support member 312 supporting the valve body 311, spring 313, and spring support 314. The valve body 311 is a rubber disc, which is pressed to a seat surface 315, so as to open and close a through hole 316. The structure of the negative pressure valve 310 allows the internal pressure of the tank main unit to decrease. When the difference in pressure from the atmospheric pressure applied to the valve body 311 is greater than the urging force of the spring 313, the valve body 311 opens, and when the difference is lower, the valve body closes. This allows the negative pressure valve 310 to keep the pressure in the tank unit above a predetermined pressure.

The tank pressure in the tank main unit is positive or negative relative to atmospheric pressure, and when the level is at or beyond a predetermined level, the positive pressure valve 300 or negative pressure valve 310 opens to adjust the level to within the predetermined range relative to atmospheric pressure.

In the aforementioned embodiment of the fueling device, since the positive pressure valve 300 and negative pressure valve 310 are housed in the casing 220, there is more space than if the valves 300 and 310 are combined in the cap main body 250, making assembly easier. The structure of the positive pressure valve 300 and negative pressure valve 310 is also simpler than if the valves 300 and 310 were disposed in a pipe branching at the side wall of the inlet pipe IP, and is less expensive.

Figure 32:
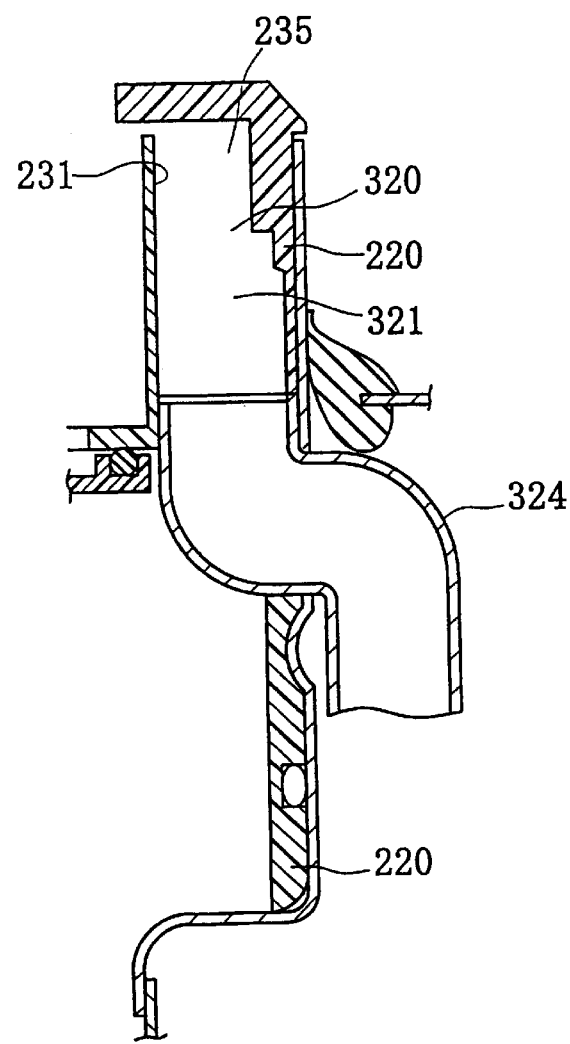
FIG. 32 is a cross section of the periphery of an atmosphere releasing passage taken along line XXXII—XXXII in FIG. 23.

FIG. 32 is a cross section of the periphery of an atmosphere releasing passage 320 along line XXXII—XXXII in FIG. 23. As shown in FIGS. 23 and 32, a cylindrical passage-forming member 235 is disposed alongside the valve-forming members 233 and 234 of the positive pressure valve 300 and negative pressure valve 310 in the casing 220. The interior of the passage-forming member 235 serves as an introducing passage 321. One side of the introducing passage 321 is connected via a detour passage (or detour circuit) 322 (FIG. 23) to the atmosphere release opening 323 in the top end of the upper case 221. As shown in FIG. 23, the atmosphere release opening 323 is disposed, at a predetermined angle in the peripheral direction of the casing 220, apart from the introducing passage 321, but is connected by the detour circuit 322. The detour circuit 322 is disposed in the space around the valve-forming members 233 and 234 in the housing space 232. The other end of the introducing passage 321 shown in FIG. 32 is connected through an atmosphere communication pipe 324 to a canister (not shown in figure). When the structure of the atmosphere release passage 320 thus constructed takes in air as the engine creates negative pressure relative to the canister during the operation of the engine, outside air is introduced through the atmosphere release opening 323, detour passage 322, introducing passage 321, and atmosphere communication pipe 324 to the canister.

Since the introducing passage 321 is thus disposed in the casing 220, fixture of the atmosphere communication pipe 324 is simpler, and the duct is easier to handle.

Since the atmosphere release opening 323 is connected via the detour passage 322 to the introducing passage 321, while air taken in flows through the detour passage 322, dust or the like contained in the air is removed, and the air is delivered to the canister. Since no dust or the like contained in the air accumulates in the canister, the canister lasts longer.

The detour passage 322 may enhance the removal of dust contained in the air by forming a labyrinth in the housing space 232 of the casing 220. A filter may also be disposed in the detour passage 322 to further clean the air taken in before it is delivered to the canister.

Figure 34:
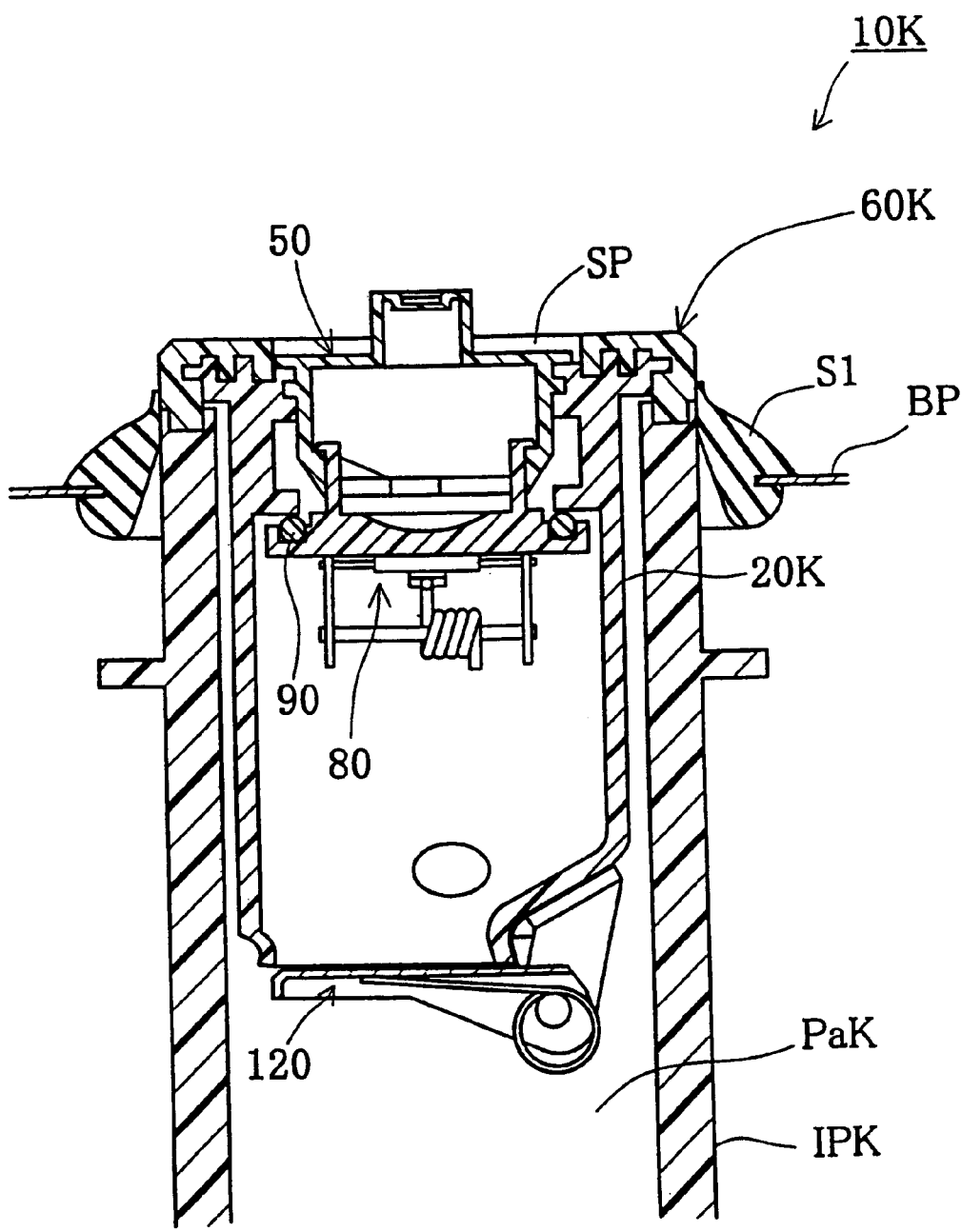
FIG. 34 is a cross section of a fueling device in an eighth embodiment of the present invention.
Figure 35:
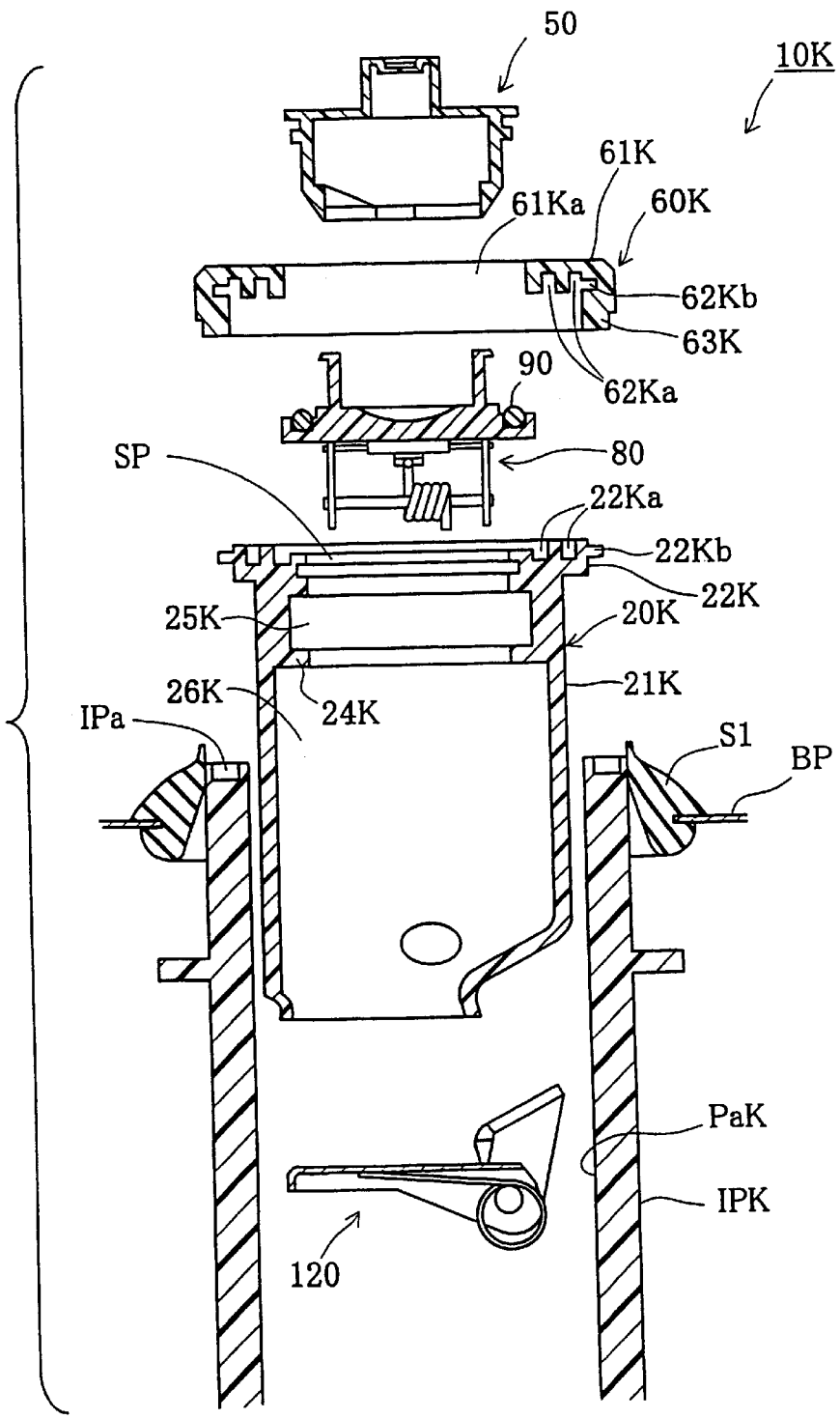
FIG. 35 is a cross section depicting an exploded view of the structural parts of the fueling device in FIG. 34.

FIG. 34 is a cross section of a vehicle (e.g., an automobile) fueling device 10K in accordance with an eighth embodiment of the present invention, and FIG. 35 is a cross section depicting an exploded view of the structural parts of the fueling device 10K. In FIGS. 34 and 35, the fueling device 10K comprises an inlet pipe IPK (fuel filler pipe) with a fuel passage PaK for supplying fuel to the fuel tank (not shown in figure), a casing main body 20K that is disposed in the inlet pipe IPK and has an inlet passage SP, a cap main body 50 for opening and closing the inlet passage SP, a seal connecting member 60K that is interposed between the inlet pipe IPK and casing main body 20K to provide an air-tight seal therebetween, a first shutter 80 attached to the inside of the casing main body 20K, a seal ring 90 attached to the first shutter 80, and a second shutter 120 attached to the bottom of the casing main body 20K.

The fueling device 10K can be fueled by a fuel gun (not shown in figure) when the cap main body 50 is removed. The structure of the fueling device 10K is described in detail below.

The inlet pipe IPK is a cylinder formed by blow molding, and is formed of a first resin material such as, for example, of a high density polyethylene. The inlet pipe IPK is supported by a body plate BP via an external seal component S1 in intimate contact with its upper outer periphery.

In FIG. 35, the casing main body 20K is disposed in the inlet pipe IIPK. The casing main body 20K is fixed to the top of the inlet pipe JPK via the sealing component (or seal connecting member) 60K, and comprises a cylindrical side wall 21K, and a flange 22K integrally formed with the top of the side wall 21K. The casing main body 20K is unitarily molded by means of injection molding using a second resin material such as a polyacetal (POM) or saturated polyester.

A partition wall 24K protrudes from the side wall 21K toward the center midway in the casing main body 20K. A mutually connected upper chamber 25K and lower chamber 26k are separated by the partition wall 24K. The upper chamber 25K and the lower chamber 26K are configured to house the cap main body 50 and the first shutter 80, respectively.

The flange 22K comprises upwardly protruding ribs 22Ka and 22Ka, and a horizontally protruding rib 22Kb. The ribs 22Ka, 22Ka, and 22Kb are protrusions that increase the joining surface area to improve the bonding strength and sealing properties with the seal connecting member 60K, as described below.

The seal connecting member 60K is a disc-shaped resin component and comprises a seal main body 61K having a through hole 61Ka in the center. Recesses 62Ka and 62Ka for increasing the joining surface area with the ribs 22Ka and 22Ka, as well as a recess 62Kb for increasing the joining surface area with the rib 22Kb, are formed on the inner surface of the through hole 61Ka. The ribs 22Ka and 22Ka and the recesses 62Ka and 62Ka mesh vertically to enhance the connecting strength in the radial direction, while the rib 22Kb and recess 62Kb mesh laterally to preserve the sealing properties. The ribs 22Ka, 22Ka, and 22Kb are thus provided vertically and laterally to increase the seal surface area and prevent the formation of gaps despite deformation of the different resins caused by fuel expansion, thus resulting in a higher degree of sealing properties.

A rib 63K that is hot welded to the upper end of the inlet pipe IPK protrudes in the form of a ring at the outer peripheral bottom of the seal connecting member 60K. The rib 63K is provided in such a way as to fit into the recess IPa formed along the top of the inlet pipe IPK.

The seal connecting member 60K is made of a third resin material such as a high density polyethylene, low density polyethylene, or polyethylene, that is, a resin material different from that of the casing main body 20K, but is made of the same material as the inlet pipe IPK or a similar hot welding resin material. Here, for the sake of convenience, the seal connecting member 60K is described while illustrated apart from the casing main body 20K, as depicted in FIG. 35. However, the seal connecting member 60K can be integrally formed by insert molding.

The process for assembling the fueling device 10K is described below. To assemble the fueling device 10K, the seal connecting member 60K and casing main body 20K are first unitarily formed in advance by means of injection molding. At this time, either the seal connecting member 60K or casing main body 20K is the insert component. Although the casing main body 20K and seal connecting member 60K are resin materials that do not hot weld together, the ribs 22Ka, 22Ka, and 22Kb of the casing main body 20K are united by being encompassed by the resin of the seal connecting member 60K.

The first shutter 80 and second shutter 120 are then attached to the casing main body 20K united with the seal connecting member 60K. The casing main body 20K is attached to the top of the inlet pipe IPK, and is then united with the inlet pipe IPK via the seal connecting member 60K. To unite the seal connecting member 60K with the inlet pipe IPK, the rib 63K of the seal connecting member 60K is welded using a preheated metal sheet, and is then inserted into the recess IPa of the inlet pipe IPK. The inlet pipe IPK and the seal connecting member 60K are thereby hot welded.

The casing main body 20K can be formed of a high density polyethylene, and the inlet pipe IPK can be formed of a polyacetal that does not hot weld with high density polyethylene, but is connected in a unitary and air-tight manner with the casing main body 20K via the seal connecting member 60K. That is, the seal connecting member 60K is united with the casing main body 20K by insert molding in the center, and is united with the inlet pipe IPK by hot welding on the outer periphery, to seal the interior of the inlet pipe IPK against the outside atmosphere. Even though the casing main body 20K and inlet pipe IPK are a polyacetal and high density polyethylene which do not hot weld together, they are united in a sealed state together in an air-tight manner.

Since the inlet pipe IPK and casing main body 20K are thus united by the seal connecting member 60K without any seal component between them, an excellent sealing can thus be obtained.

The casing main body 20K and inlet pipe IPK can be made of different resin materials suited to their respective functions. That is, the resin material for forming the casing main body 20K may be a polyacetal that has low resin shrinkage during injection molding and that can provide greater surface precision on the seat surface, whereas the material for the inlet pipe IPK may be a high density polyethylene for reasons of formability, mechanical strength, and cost. The casing main body 20K and inlet pipe IPK thus involve the use of resin materials different from each other, yet are unified in such a way that the interior of the inlet pipe IPK is sealed in an air-tight manner against the outside.

One advantage of this embodiment is that the seal connecting member 60K is insert molded at the joined surface with the casing main body 20K via ribs 22Ka, 22Ka, and 22Kb that expand the surface area, thus resulting in greater bonding strength and higher sealing properties.

Figure 36:
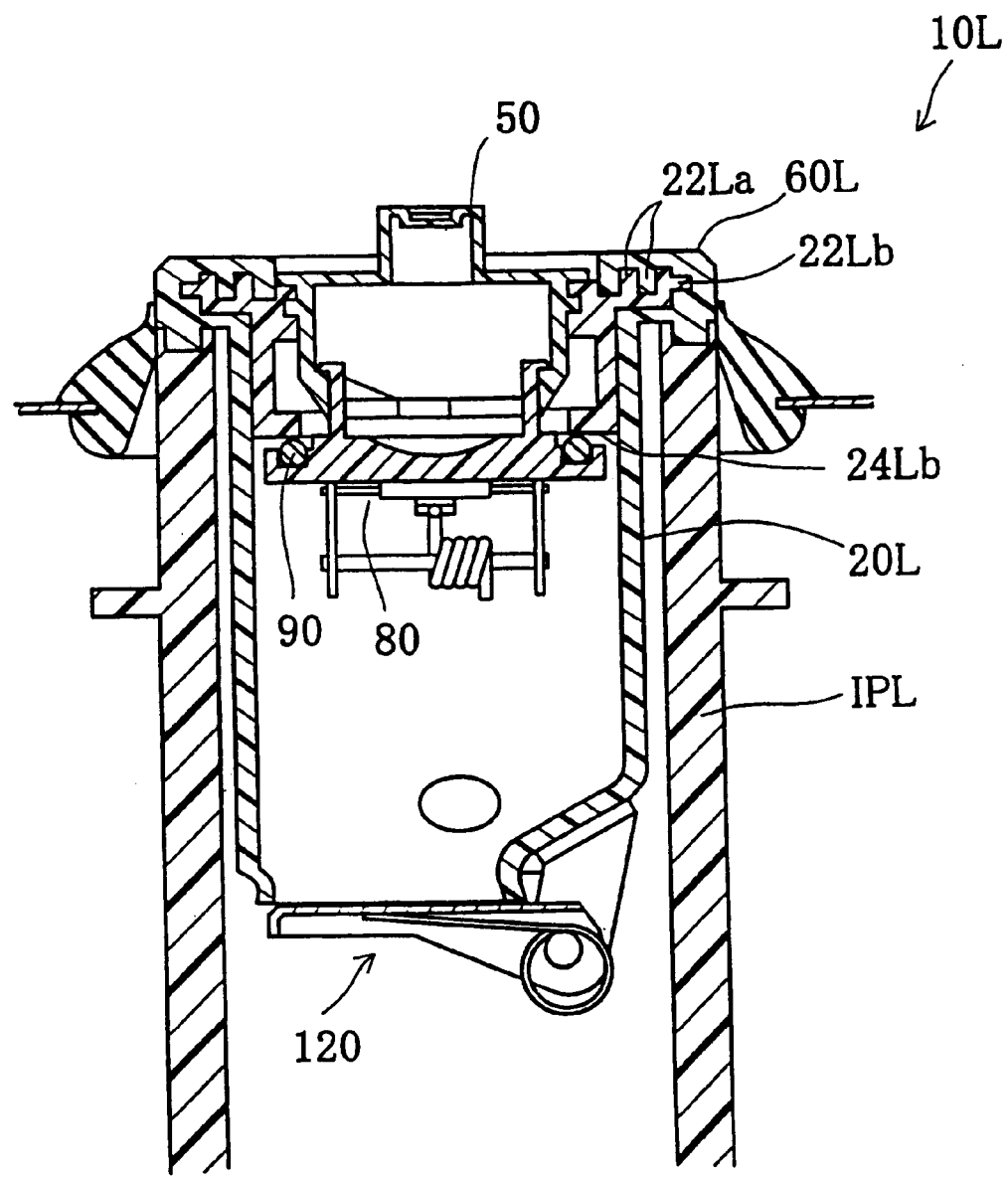
FIG. 36 is a cross section of a fueling device in accordance with a ninth embodiment of the present invention.

FIG. 36 is a cross section of a fueling device 10L in accordance with a ninth embodiment. The structure and operation of the cap main body 50, first shutter 80, and second shutter 120 of the fueling device 10L are the same as in the eighth embodiment, but the configurations of the casing main body 20L and seal connecting member 60L are different.

That is, the casing main body 20L comprises a seat surface 24Lb to which the seal ring 90 seals. The seal connecting member 60L connects the casing main body 20L and the inlet pipe IPL. The seal connecting member 60L is insert molded to the casing main body 20L, and is hot welded at the periphery to the inlet pipe IPL. The upper portion of the seal connecting member 60L is connected via ribs 22La, 22La, and 22Lb to increase the bonding strength and sealing properties, and the outer periphery is hot welded by hot plate welding to the inlet pipe IPL. The seal connecting member 60L extends downward from the outer periphery of the casing main body 20L, and the second shutter 120 is attached to the bottom.

In this embodiment as well, the casing main body 20L and the inlet pipe IPL are made of different resin materials, yet are connected by the seal connecting member 60L, resulting in a high degree of air-tightness.

Figure 37:
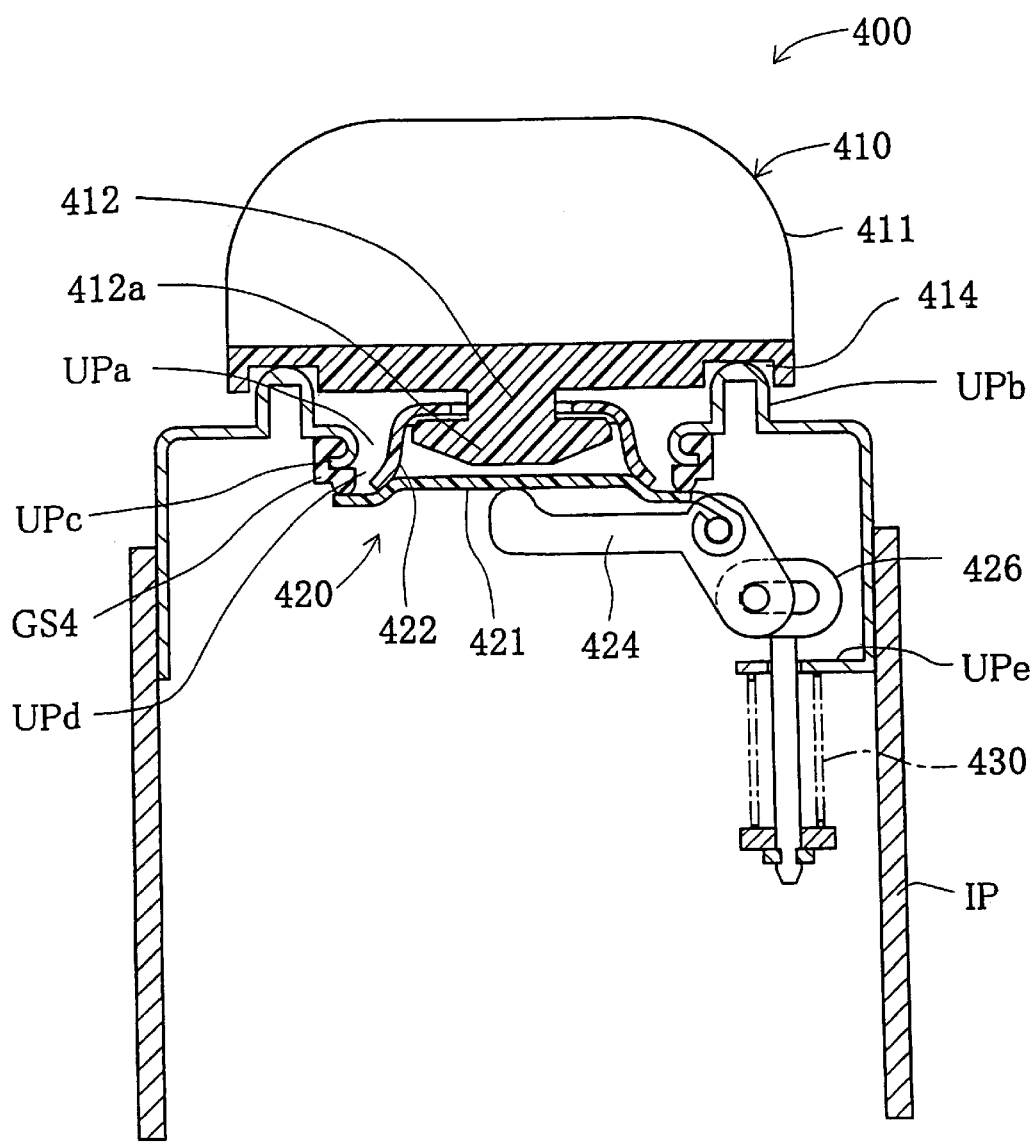
FIG. 37 is a cross section depicting a fueling device in accordance with a tenth embodiment of the present invention.
Figure 38:
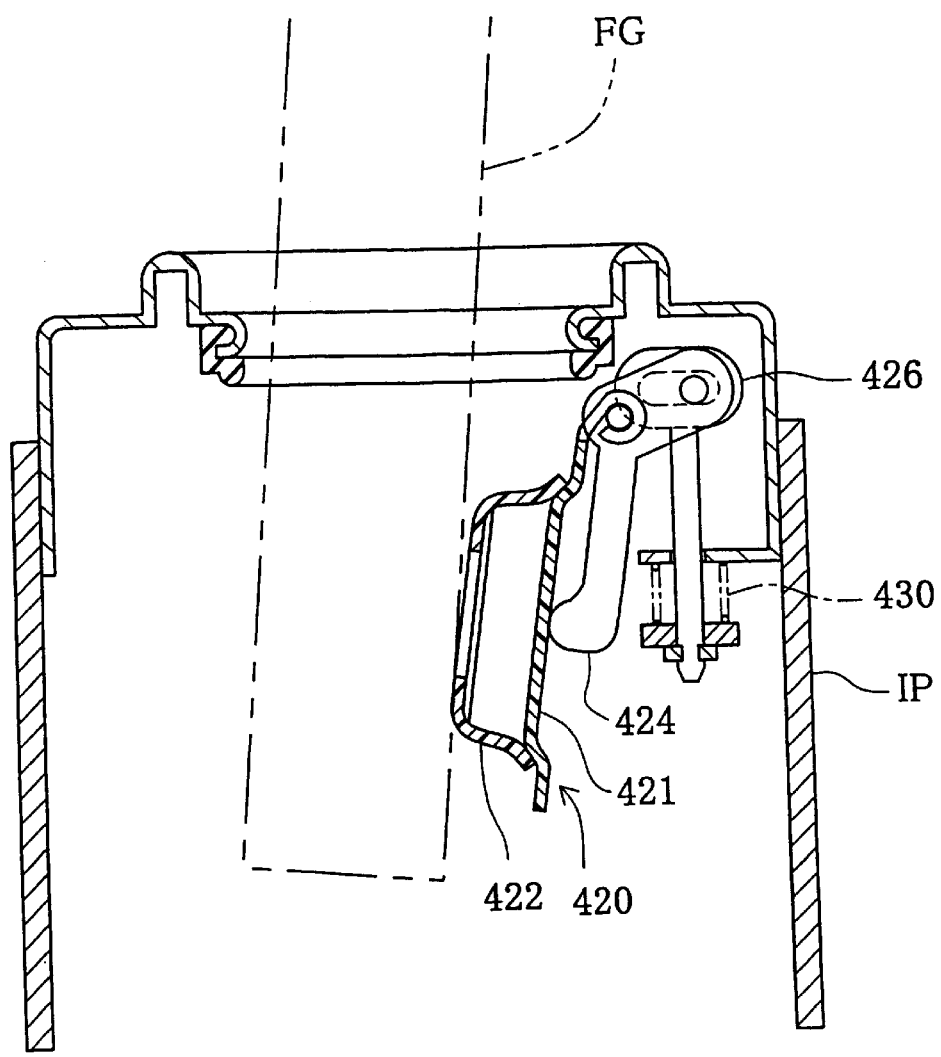
FIG. 38 is an illustration of a fuel gun inserted into the fueling device of the tenth embodiment.
Figure 39:
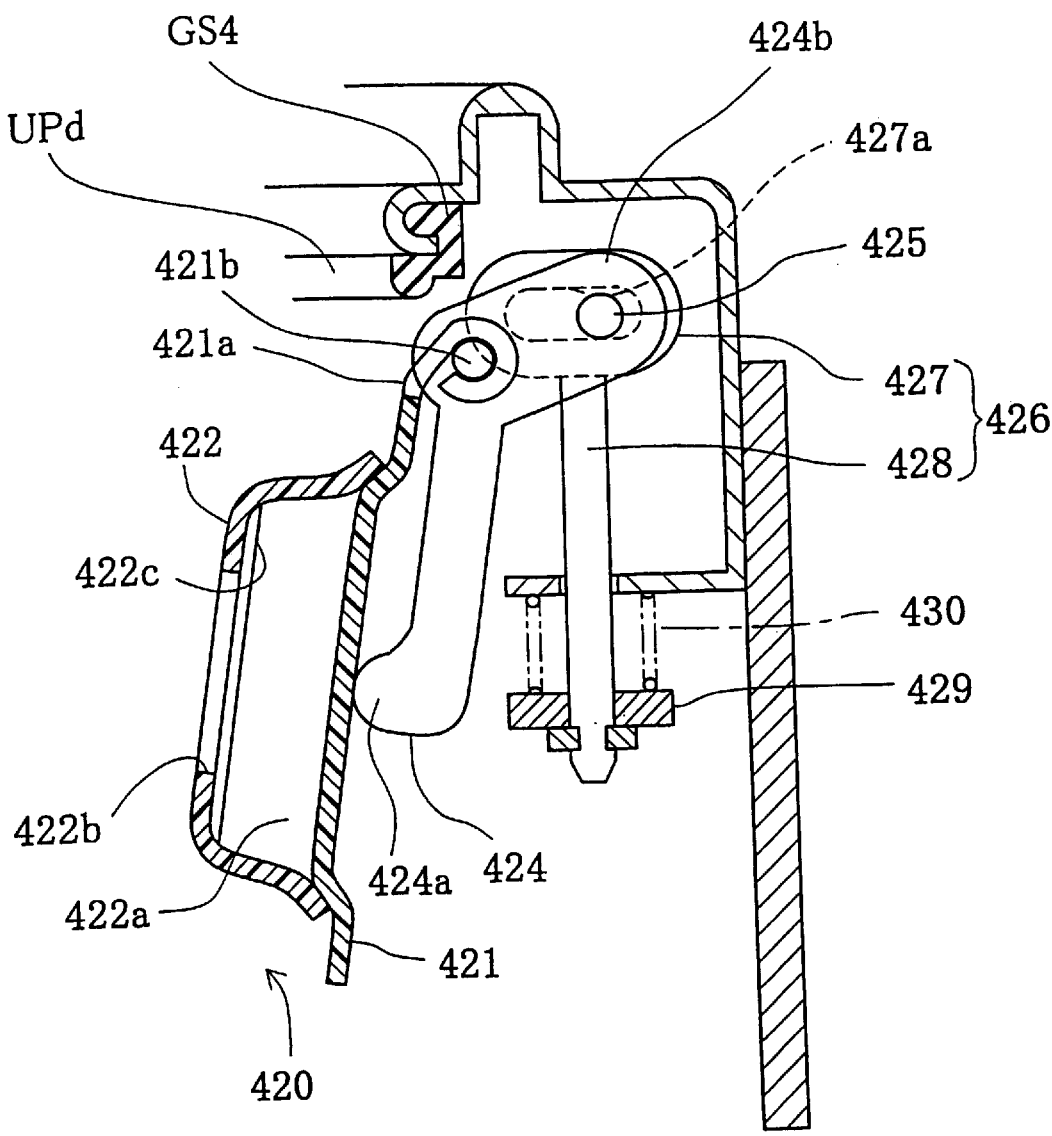
FIG. 39 is an enlarged cross section of the fueling device illustrated in FIG. 38.

FIGS. 37 through 39 are sectional views illustrating a fueling device 400 of a tenth embodiment of the present invention. The fueling device 400 has a characteristic structure, in which a shutter 420 is incorporated in an upper tubular body UP integrally fixed to an upper end of an inlet pipe IP. The fueling device 400 includes the upper tubular body UP fixed to the upper end of the inlet pipe IP, a cap main body 410, the shutter 420, a guide member 426, and a spring 430.

An inlet opening UPa is formed in the upper portion of the upper tubular body UP. The inlet opening UPa has a positioning step UPb along the outer circumference thereof and a seal support end UPc along the inner circumference thereof. A gasket GS4 is held on the seal support end UPc. The cap main body 410 has a handle 411, which is rotationally operated, on the upper portion thereof, and a fitting projection 412 with a fitting end 412a on the lower surface thereof A positioning recess 414 is formed on the lower surface of the cap main body 410 and causes the positioning step UPb to be rotatably positioned therein.

FIG. 39 is an enlarged sectional view illustrating the periphery of the shutter 420. The shutter 420 is a member to open and close a seal opening UPd. The shutter 420 includes a shutter plate 421, a fitting cover 422, a support arm 424, the guide member 426, and the spring 430. The fitting cover 422 is combined with the shutter plate 421 to define a fitting chamber 422a therebetween. An insertion aperture 422b is formed on the center of the fitting cover 422 to receive the fitting end 412a therein. A cam surface 422c is formed on the inner wall of the fitting cover 422. The cam surface 422c is an inclined surface, along which the upper face of the fitting end 412a is extended to pull up the shutter 420. The shutter plate 421 is supported by an axis 421b to be pivotally movable round a pivot end 421a. The lower surface of the shutter plate 421 is supported by a support end 424a of the support arm 424. The other end of the support arm 424 is held by the axis 421b to allow pivotal movement of the support arm 424. A linkage piece 424b on the other end of the support arm 424 is linked with the guide member 426 via a joint pin 425. The guide member 426 includes a guide plate 427 and a guide shaft 428 that are formed integrally.

The guide plate 427 has a guide slot 427a to support the joint pin 425 in a slidable manner. A stopper 429 is fixed to the lower end of the guide shaft 428. The spring 430 is spanned between the stopper 429 and a spring support end UPe. The pressing force of the spring 430 is applied to press the shutter plate 421 against the gasket GS4 via the guide member 426 and the support arm 424.

When the inlet opening UPa is in the closed state as shown in FIG. 37, the cap main body 410 is opened according to the following procedure. The procedure rotates the handle 411 counterclockwise and pulls the fitting end 412a of the cap main body 410 out of the insertion aperture 422b of the shutter 420. The shutter plate 421 is then in contact with the gasket GS4, while the shutter 420 is pressed only by the spring 430. Under such conditions, a fuel supply gun FG is inserted through the inlet opening UPa as shown in FIG. 38. The end of the fuel supply gun FG presses the upper surface of the fitting cover 422 to pivotally rotate the shutter plate 421 round the axis 421b. The pivotal rotation of the shutter plate 421 rotates the support arm 424 in the same direction and causes the linkage piece 424b to pull up the guide member 426 via the joint pin 425 against the pressing force of the spring 430. The shutter 420 is accordingly set open to allow a fuel supply. After completion of the fuel supply, the fuel supply gun FG is pulled out of the inlet opening UPa. The pressing force of the spring 430 is then applied to the shutter plate 421 via the guide member 426 and the support arm 424, so as to rotate the shutter 421 clockwise and close the seal opening UPd. In this state, the procedure positions the fitting end 412a of the cap main body 410 in the insertion aperture 422b, and rotates the cap map body 410 clockwise. The fitting end 412a then pulls up the shutter 420 along the cam surface 422c towards the gasket GS4, so that the outer circumferential surface of the shutter plate 421 is intensely pressed against the gasket GS to attain sealing.

The arrangement of the tenth embodiment, in which the upper tubular body UP is fixed to the inlet pipe IP, desirably simplifies the structure.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A fueling device assembly for fueling a fuel tank, comprising:

a fuel filler pipe having a fuel passage connected to a fuel tank, said fuel filler pipe being made of a first resin material;

a casing main body disposed in said fuel filler pipe for introducing fuel, said casing main body having an inlet passage connected to a fuel passage, and a seat surface facing away from said inlet passage, said casing main body being made of a second resin material that is different from the first resin material;

a cap main body including a handle, said cap main body being operable by said handle between an open position in which said cap main body is disengaged from said casing main body to permit introduction of fuel through said inlet opening and a closed position in which said cap main body engages said casing main body to obstruct fuel from being introduced through said inlet opening;

a shutter, disposed in said fuel filler pipe, for opening and closing said fuel passage;

a connector that operatively couples said cap main body to said shutter in such a manner that movement of said cap main body to the closed position applies a closing force to said shutter to urge said shutter closed; and a seal connecting member made of a third resin material interposed between the fuel filler pipe and casing main body to effect air-tight sealing, the seal connecting member having an inner end insert molded to said casing main body and an outer rib welded to a recess of said fuel filler pipe.

2. A fueling device for fueling a fuel tank through a fuel passage of a fuel filter pipe communicating with the fuel tank, said fueling device comprising:

a casing main body mountable in the fuel passage of the fuel filler pipe, said casing main body having an inlet opening for introducing fuel therethrough;

a cap main body including a handle, said cap main body being movable by operation of said handle between an open position in which said cap main body is disengagable from said casing main body to permit introduction of fuel through said inlet opening and a closed position in which said cap main body engages said casing main body to instruct fuel from being introduced though said inlet opening;

a first shutter coupled to said casing main body and arranged to be disposed in the fuel filler pipe when said casing main body is mounted in the fuel passage, said first shutter being operable to open and close the fuel passage;

a connector that operatively couples said cap main body to said first shutter in such a manner that movement of said cap main body to the closed position applies a closing force to said first shutter to close said first shutter;

a second shutter coupled to said casing main body and arranged farther from said inlet opening than said first shutter, said second shutter being operable to open and close the fuel passage; and a seal connecting member made of a third resin material interposed between the fuel filler pipe and casing main body to effect air-tight sealing, the seal connecting member having an inner end insert molded to an end with a rib of said casing main body and an outer end welded to an end of said fuel filler pipe.

3. A fueling device assembly for fueling a fuel tank, comprising:

a fuel filler pipe having a fuel passage connected to a fuel tank, said fuel filler pipe being made of a first resin material;

a casing main body disposed in said fuel filler pipe for introducing fuel, said casing main body having an inlet passage connected to a fuel passage, and a seat surface facing away from said inlet passage, said casing main body being made of a second resin material that is different from the first resin material;

a cap main body comprising a handle, said cap main body being operable by said handle between an open position in which said cap main body is disengaged from said casing main body to permit introduction of fuel through said inlet opening and a closed position in which said cap main body engages said casing main body to obstruct fuel from being introduced through said inlet opening;

a shutter, disposed in said fuel filler pipe, for opening and closing said fuel passage;

a connector that operatively couples said cap main body to said shutter in such a manner that movement of said cap main body to the closed position applies a closing force to said shutter to urge said shutter closed; and a seal connecting member made of a third resin material interposed between the fuel filler pipe and casing main body to effect air-tight sealing, the seal connecting member having an inner end insert molded to said casing main body and an outer end welded to said casing main body, wherein said casing main body has ribs, and said seal connecting member has recesses conforming to and receiving corresponding ones of said ribs.

4. A fueling device assembly for fueling a fuel tank, comprising:

a fuel filler pipe having a fuel passage connected to a fuel tank, said fuel filler pipe being made of a first resin material;

a casing main body disposed in said fuel filler pipe for introducing fuel, said casing main body having an inlet passage connected to a fuel passage, and a seat surface facing away from said inlet passage, said casing main body being made of a second resin material that is different from the first resin material;

a cap main body including a handle, said cap main body being operable by said handle between an open position in which said cap main body is disengaged from said casing main body to permit introduction of fuel through said inlet opening and a closed position in which said cap main body engages said casing main body to obstruct fuel from being introduced through said inlet opening;

a shutter, disposed in said fuel filler pipe, for opening and closing said fuel passage;

a connector that operatively couples said cap main body to said shutter in such a manner that movement of said cap main body to the closed position applies a closing force to said shutter to urge said shutter closed; and a seal connecting member made of a third resin material interposed between the fuel filler pipe and casing main body to effect air-tight sealing, the seal connecting member having inner recesses conforming to and receiving one of ribs of said casing main body and an outer end welded to an end of said fuel filler pipe.

* * * * *